US012361870B2

(12) United States Patent
Moon et al.

(10) Patent No.: US 12,361,870 B2
(45) Date of Patent: Jul. 15, 2025

(54) ELECTRONIC DEVICE

(71) Applicant: Samsung Display Co., Ltd., Yongin-si (KR)

(72) Inventors: Gyeong-Ub Moon, Yongin-si (KR); Jongyeop An, Yongin-si (KR); Dongwook Yang, Yongin-si (KR); Hyeon Jun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/752,517

(22) Filed: Jun. 24, 2024

(65) Prior Publication Data

US 2025/0095554 A1 Mar. 20, 2025

(30) Foreign Application Priority Data

Sep. 20, 2023 (KR) ........................ 10-2023-0125393

(51) Int. Cl.
*G09G 3/32* (2016.01)

(52) U.S. Cl.
CPC ....... *G09G 3/32* (2013.01); *G09G 2300/0828* (2013.01); *G09G 2360/14* (2013.01); *G09G 2380/08* (2013.01)

(58) Field of Classification Search
CPC ............. G09G 3/32; G09G 2300/0828; G09G 2360/14; G09G 2380/08
See application file for complete search history.

(56) References Cited

U.S. PATENT DOCUMENTS

| | | | | |
|---|---|---|---|---|
| 10,398,324 | B2 | 9/2019 | Mukkamala et al. | |
| 10,452,937 | B2 | 10/2019 | Jin et al. | |
| 10,983,558 | B2 * | 4/2021 | Kim | G06V 40/1306 |
| 11,158,258 | B2 | 10/2021 | Cha et al. | |
| 11,354,933 | B2 * | 6/2022 | Lee | A61B 5/02007 |
| 11,574,505 | B2 | 2/2023 | Lee et al. | |
| 2015/0073239 | A1 * | 3/2015 | Pei | A61B 5/14551 600/324 |
| 2020/0043417 | A1 * | 2/2020 | Yang | G06V 40/1306 |
| 2020/0193138 | A1 * | 6/2020 | Li | G06V 40/1318 |

FOREIGN PATENT DOCUMENTS

| | | |
|---|---|---|
| KR | 10-2017-0141522 A | 12/2017 |
| KR | 10-2021-0064483 A | 6/2021 |
| KR | 10-2021-0157952 A | 12/2021 |

* cited by examiner

*Primary Examiner* — Andrew Sasinowski
(74) *Attorney, Agent, or Firm* — Womble Bond Dickinson (US) LLP

(57) ABSTRACT

Provided is an electronic device including a display panel having defined therein a display region including first to third regions, the display panel being configured to operate in a sensing mode, and including a first pixel in the first region, a second pixel in the second region, and a third pixel in the third region that include a pixel-driving circuit and a light-emitting element, and a first sensor in the first region, a second sensor, and a third sensor that include a sensor-driving circuit and a detection element, and a readout circuit electrically connected to the first, second, or third sensors, wherein, in the sensing mode, the first pixel is configured to emit first light, the second pixel is configured to emit second light, the third pixel is configured to emit no light, and the readout circuit is configured to receive a readout signal from the first sensor.

20 Claims, 13 Drawing Sheets

ELECTRONIC DEVICE

CROSS-REFERENCE TO RELATED APPLICATIONS

The present application claims priority to, and the benefit of, Korean Patent Application No. 10-2023-0125393, filed on Sep. 20, 2023, in the Korean Intellectual Property Office, the entire disclosure of which is incorporated herein by reference.

BACKGROUND

1. Field

The present disclosure herein relates to an electronic device capable of sensing blood pressure.

2. Description of the Related Art

The advancement of the information society brings with it a rising demand for diversified electronic devices for displaying images. These electronic devices are now applicable to electronics in various forms, such as smartphones, digital cameras, laptop computers, tablet PCs, navigation systems, and smart televisions. Portable electronic devices, such as smartphones and tablet PCs, are equipped with diverse functions, such as video recording, fingerprint recognition, and facial recognition.

Lately, there has emerged a strong interest in the healthcare industry, and thus simple methods for obtaining biometric information about health are in development. For example, efforts are being made to turn a traditional oscillometric blood pressure measuring device into a portable blood pressure measuring device.

However, the portable blood pressure measuring device itself requires an independent light source, sensors, and display, and brings about the inconvenience of having to be carried separately in addition to portable smartphones or tablet PCs.

SUMMARY

One or more embodiments of the present disclosure provide an electronic device including a display panel having defined therein a display region including a first region, a second region adjacent to the first region, and a third region surrounding the first region and the second region, the display panel being configured to operate in a sensing mode, and including a first pixel in the first region, a second pixel in the second region, and a third pixel in the third region that include a pixel-driving circuit and a light-emitting element, and a first sensor in the first region, a second sensor, and a third sensor that include a sensor-driving circuit and a detection element, and a readout circuit electrically connected to the first sensor, the second sensor, or the third sensor, wherein, in the sensing mode, the first pixel is configured to emit first light with a first luminance, the second pixel is configured to emit second light with a second luminance that is different from the first luminance, the third pixel is configured to emit no light, and the readout circuit is configured to receive a readout signal from the first sensor.

The first sensor, the second sensor, or the third sensor in the display region may be configured to sense blood pressure in the sensing mode.

The third sensor may be in the third region.

In the sensing mode, the first pixel, the first sensor, and the second pixel may be configured to be turned on, and the second sensor, the third pixel, and the third sensor may be configured to be turned off.

The first luminance may be lower than the second luminance.

The sensor-driving circuit may include a reset transistor including a gate electrode electrically connected to the detection element for receiving a reset control signal, a first electrode for receiving a reset voltage, and a second electrode connected to a first sensing node, an amplifying transistor including a first electrode for receiving a sensor driving voltage, a second electrode connected to a second sensing node, and the gate electrode connected to the first sensing node, and an output transistor including a first electrode connected to the second sensing node, a second electrode connected to a readout line, and a gate electrode for receiving an output control signal.

The readout circuit may further include an amplifier circuit for receiving the readout signal from the sensor-driving circuit through the readout line, and for amplifying the readout signal, a sample-and-hold portion for sampling a signal provided from the amplifier circuit, for holding the signal, and including a reset portion that includes a first switch and a first capacitor, and a hold portion that includes a second switch and a second capacitor, and an analog-to-digital converter for digitizing an analog signal provided from the sample-and-hold portion.

The first region may have a circular shape, wherein the second region has a donut shape surrounding the first region.

The first region may have a polygonal shape, wherein the second region surrounds the first region.

The second region may include a (2-1)-th region, and a (2-2)-th region spaced apart from the (2-1)-th region, wherein the first region is between the (2-1)-th region and the (2-2)-th region.

The second light may include (2-1)-th light having a first wavelength, and (2-2)-th light having a second wavelength that is different from the first wavelength, wherein the second region further includes a (2-3)-th region adjacent the first region, wherein the (2-1)-th light is configured to be emitted to the (2-1)-th region and to the (2-2)-th region, wherein the (2-2)-th light is configured to be emitted to the (2-3)-th region, wherein the first region includes a (1-1)-th region configured to receive light from the (2-1)-th to (2-3)-th regions, and a (1-2)-th region configured to receive light from the (2-1)-th region and the (2-2)-th region.

The first luminance may gradually decrease away from a center of the first region.

The first light may have a first wavelength, wherein the second light has a second wavelength that is different from the first wavelength.

The first wavelength may be shorter than the second wavelength.

In one or more embodiments of the present disclosure, an electronic device includes a display panel having a display region including a first region, a second region adjacent to the first region, and a third region surrounding the first region and the second region, and including pixels including a pixel-driving circuit, a light-emitting element, first pixels in the first region, second pixel in the second region, third pixels in the third region, readout lines, and sensors including a sensor-driving circuit and a detection element, and electrically connected to a readout circuit through one of the readout lines, wherein, in a sensing mode, the first pixels are configured to emit light with a first luminance, the second pixels are configured to emit second light with a second luminance that is different from the first luminance, the third pixels are configured to emit no light, and the readout circuit is configured to receive a readout signal from ones of the sensors in the second region.

The sensors in the display region may be configured to sense blood pressure.

The first luminance may be lower than the second luminance.

The first region may have a circular shape, wherein the second region has a donut shape surrounding the first region.

The first region may have a polygonal shape, wherein the second region surrounds the first region.

The second region may include a (2-1)-th region, and a (2-2)-th region spaced apart from the (2-1)-th region, wherein the first region is between the (2-1)-th region and the (2-2)-th region.

BRIEF DESCRIPTION OF THE DRAWINGS

The accompanying drawings are included to provide a further understanding of the present disclosure, and are incorporated in, and constitute a part of, this specification. The drawings illustrate embodiments of the present disclosure and, together with the description, serve to explain aspects of the present disclosure. In the drawings.

DETAILED DESCRIPTION

Figure 1:
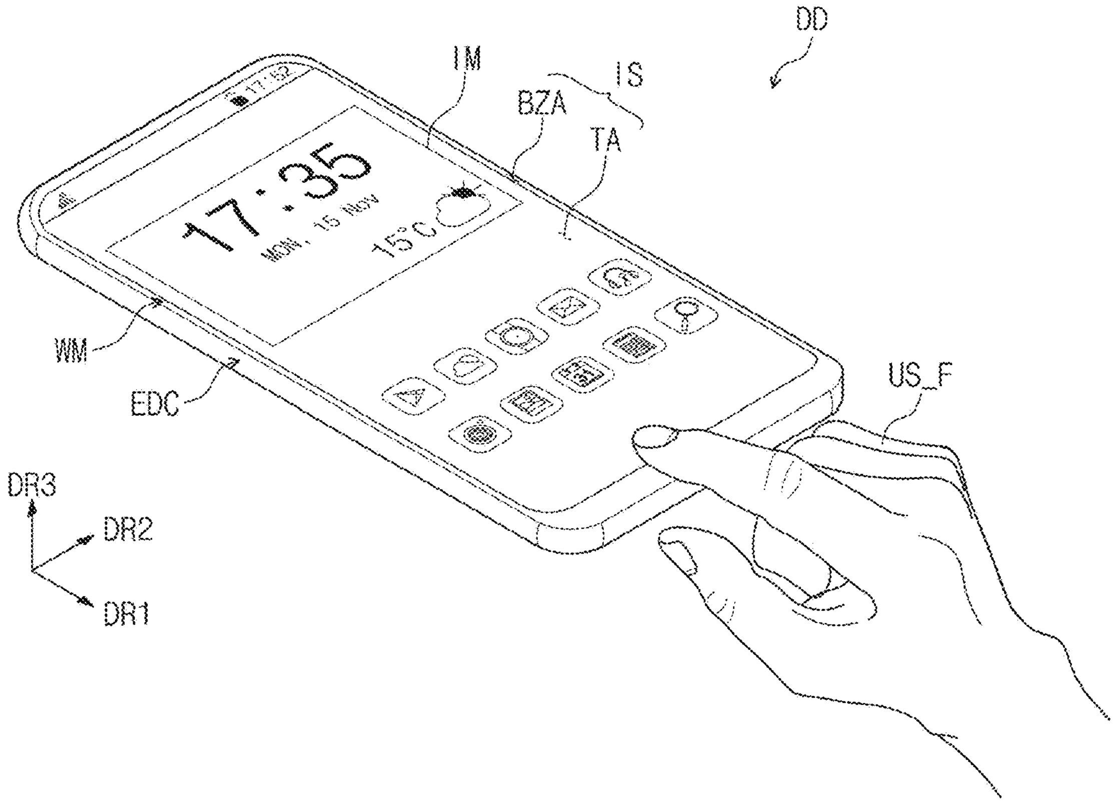
FIG. 1 is a perspective view of an electronic device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region.

Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
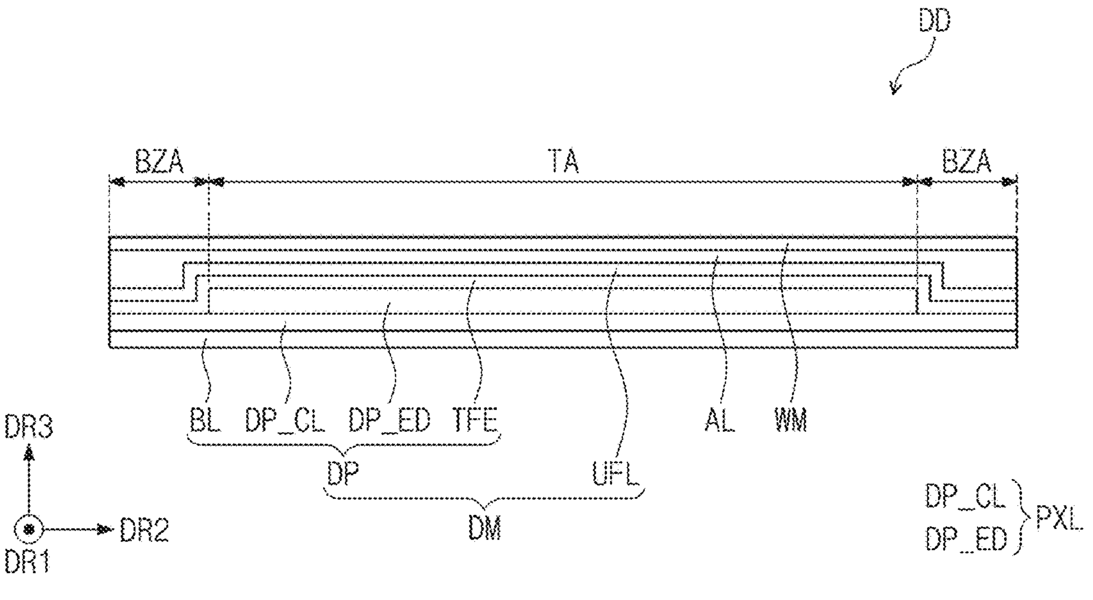
FIG. 2 is a cross-sectional view of an electronic device according to one or more embodiments of the present disclosure.

FIG. 1 is a perspective view of an electronic device DD according to one or more embodiments of the present disclosure. FIG. 2 is a cross-sectional view of an electronic device DD according to the present disclosure.

Referring to FIGS. 1 and 2, the electronic device 1000 may be a mobile phone, a tablet, a car navigation system, a game console, or a wearable device, but is not limited thereto. In FIG. 1A, a mobile phone is shown as an example of the electronic device DD.

In addition, FIG. 1 shows a bar-shaped rigid type electronic device DD as an example, but the present disclosure is not particularly limited thereto. For example, the electronic device DD may be a foldable, rollable, or slidable type electronic device DD.

An upper surface of the electronic device DD may be defined as a display surface IS, and the display surface IS may have a plane defined by a first direction DR1 and a second direction DR2. Images IM generated in the electronic device DD may be provided to users through the display surface IS.

Hereinafter, a normal direction, which is substantially perpendicular to a plane defined by the first direction DR1 and the second direction DR2, is defined as a third direction DR3. In the present description, "when viewed on a plane" may be defined as viewed from the third direction DR3. That is, the plane may be parallel to a plane defined by the first direction DR1 and the second direction DR2.

The display surface IS may be divided into a transmission region TA and a bezel region BZA. The transmission region TA may be a portion in which the images IM are displayed. Users view the images IM through the transmission region TA. The transmission region TA is shown to be of rectangular shape with rounded corners. However, this is presented as an example, and the transmission region TA may be of various shapes, such as rectangular, circular, or square shape, and is not limited to any one embodiment.

The bezel region BZA is adjacent to the transmission region TA. The bezel region BZA may have a color (e.g., predetermined color). The bezel region BZA may surround the transmission region TA (e.g., in a plan view). Accordingly, the shape of the transmission region TA may be substantially defined by the bezel region BZA. However, this is merely shown as an example, and the bezel region BZA may be located adjacent to only one side of the transmission region TA or may not be provided.

The electronic device DD may detect external inputs applied from the outside. The external inputs may include various forms of inputs provided from outside the electronic device DD. For example, the external inputs may include external inputs applied when approaching the electronic device DD or being adjacent by a distance (e.g., predetermined distance, which may be referred to as hovering), as well as contact by a body part, such as a user's hand US_F. In addition, the external inputs may have various forms, such as force, pressure, temperature, light, and the like. The external inputs may be provided through a separate device, for example, an active pen or a digitizer pen. In addition, the electronic device DD may detect users' biometric information provided from outside, or may measure surrounding brightness.

An outer portion of the electronic device DD may be constructed by a window WM and a housing EDC. For example, the window WM and the housing EDC may combine together, and other components of the electronic device DD (e.g., a display module DM) may be accommodated therein.

A front surface of the window WM may define the display surface IS of the electronic device DD. The window WM may include an optically transparent insulating material. For example, the window WP may include glass or plastic. The window WM may have a multi-layer structure or a single-layer structure. For example, the window WM may include a plurality of plastic films bonded through an adhesive, or a glass substrate and a plastic film, which are bonded through an adhesive.

The housing EDC may include a material having a relatively higher rigidity. For example, the housing EDC may include a plurality of frames and/or plates formed of glass, plastic, or metal, or a combination thereof. The housing EDC may stably protect components of the electronic device DD, which are accommodated in the internal space, against external impacts. In one or more embodiments, a battery module for supplying power required for the overall operation of the electronic device DD may be further located between the display module DM and the housing EDC.

Referring to FIG. 2, the electronic device DD may include a display module DM, an adhesive layer AL, and a window WM, and the display module DM may include a display panel DP and an upper functional layer UFL.

The display panel DP may be a component for substantially generating the images IM (see FIG. 1). The display panel DP may be a light-emitting display panel, and for example, the display panel DP may be an organic light-emitting display panel, an inorganic light-emitting display panel, an organic-inorganic light-emitting display panel, a quantum dot display panel, a micro LED display panel, or a nano LED display panel. Hereinafter, the display panel DP is described as an organic light-emitting display panel.

The display panel DP includes a base layer BL, a pixel layer PXL, and an encapsulation layer TFE. The display panel DP according to one or more embodiments of the present disclosure may be a flexible display panel or a rigid display panel. For example, the display panel DP may be a foldable display panel that is folded with respect to a folding axis, a rollable display panel that is rolled at least in part with respect to a rotation axis, or a slidable display panel.

The base layer BL may include a synthetic resin layer. The synthetic resin layer may be a polyimide resin layer, and the material is not particularly limited. In addition, the base layer BL may include a glass substrate, a metal substrate, or an organic/inorganic composite material substrate.

The pixel layer PXL is located on the base layer BL (as used herein, "located on" may mean "above"). The pixel layer PXL may include a circuit layer DP_CL and an element layer DP_ED.

The circuit layer DP_CL is located between the base layer BL and the element layer DP_ED. The circuit layer DP_CL includes at least one insulating layer and/or a circuit element. Hereinafter, an insulating layer included in the circuit layer DP_CL is referred to as an intermediate insulating layer. The intermediate insulating layer may include at least one intermediate inorganic film and/or at least one intermediate organic film.

The circuit element may include a pixel-driving circuit PDC (see FIG. 4A) included in each of a plurality of pixels PX (see FIG. 3) for displaying images, a sensor-driving circuit O_SD (see FIG. 4A) included in each of a plurality of sensors FX (see FIG. 3) for recognizing external information, and the like. The circuit layer DP_CL may further include signal lines connected to the pixel-driving circuit PDC (see FIG. 4A) and/or the sensor-driving circuit O_SD (see FIG. 4A).

The device layer DP_ED may include a light-emitting element ED (see FIG. 4A) included in each of the plurality of pixels PX and a light detection element OPD (see FIG. 4A) included in each of the plurality of sensors FX. In one or more embodiments, the light detection element OPD may be a photo diode, for example, an organic photo diode. The light detection element OPD may be a sensor that detects or responds to light reflected by a user's fingerprint. The circuit layer DP_CL and the element layer DP_ED will be described in detail later with reference to FIG. 4B.

The encapsulation layer TFE seals the element layer DP-ED. The encapsulation layer TFE may include at least one organic layer and at least one inorganic layer. The inorganic film may include an inorganic material, and may protect the element layer DP-ED from moisture/oxygen. The inorganic film may include a silicon nitride layer, a silicon oxy nitride layer, a silicon oxide layer, a titanium oxide layer, an aluminum oxide layer, and the like, but is not particularly limited thereto. The organic layer includes an organic material, and may protect the element layer DP-ED from foreign materials, such as dust particles.

The upper functional layer UFL may be located on the display panel DP. The upper functional layer UFL may be formed on the display panel DP through a roll-to-roll process, but the present disclosure is not limited thereto. The upper functional layer UFL may include a sensor layer for detecting the coordinates of external inputs and an anti-reflection layer for reducing the reflectance of external light incident from the outside. The sensor layer may be located on the display panel DP, and the anti-reflection layer may be located on the sensor layer. However, the present disclosure is not limited thereto, and the upper functional layer UFL may include only a sensor layer or only an anti-reflection layer.

The anti-reflection layer may include color filters, a black matrix, and a planarization layer. The color filters may have an arrangement (e.g., predetermined arrangement). For example, the color filters may be arranged in consideration of light-emitting colors of pixels included in the display panel DP. In one or more other embodiments, the anti-reflection layer may include a black matrix and a reflection adjustment layer. The reflection adjustment layer may selectively absorb some bands of light reflected from inside the display panel DP and/or the electronic device or light incident from outside the display panel DP and/or the electronic device. In one or more other embodiments, the anti-reflection layer may be a polarizing film.

The electronic device DD according to one or more embodiments of the present disclosure may further include an adhesive layer AL. The window WM may be attached to the upper functional layer UFL through the adhesive layer AL. The adhesive layer AL may include an optical clear adhesive, an optically clear adhesive resin, or a pressure sensitive adhesive (PSA).

Figure 3:
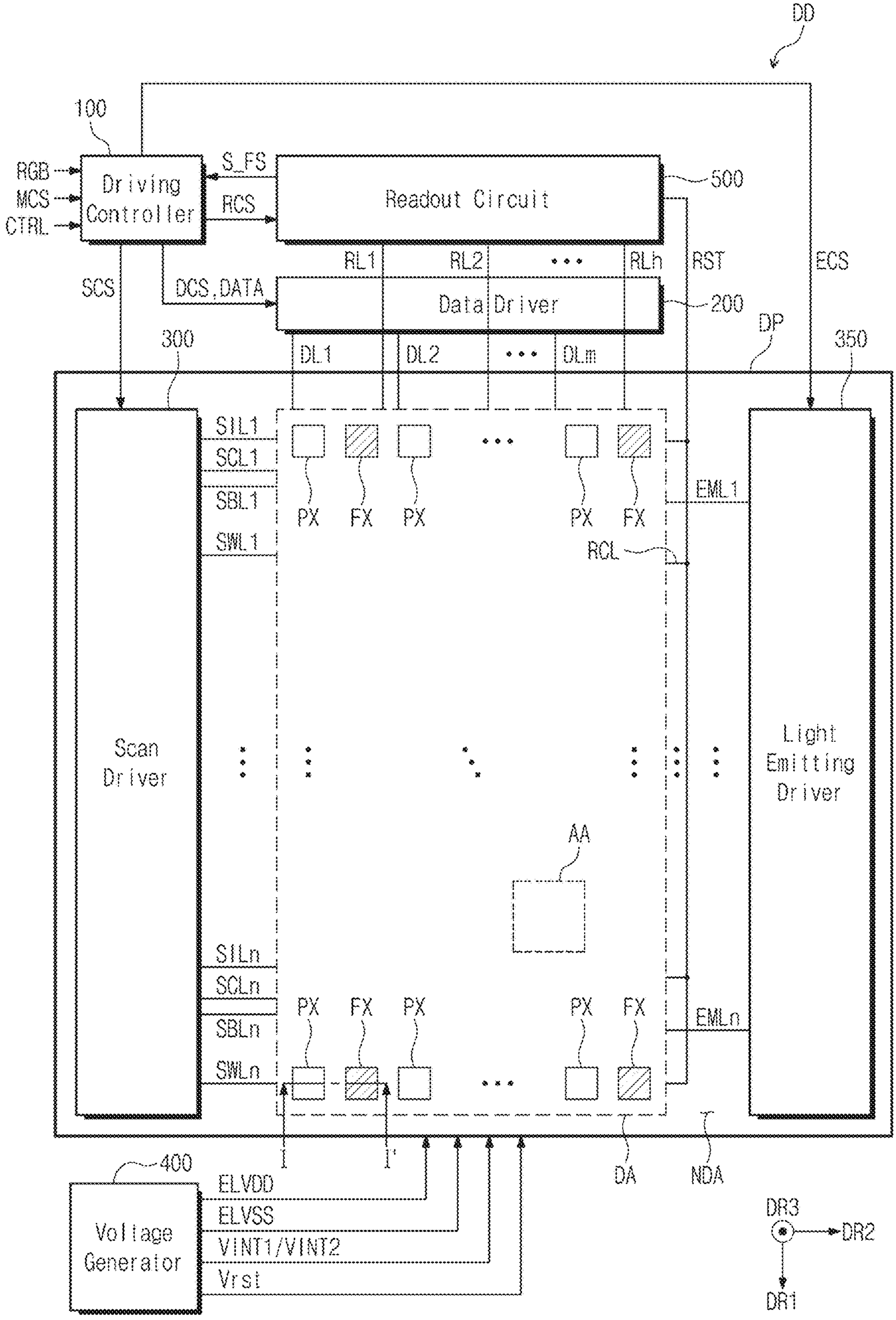
FIG. 3 is a block diagram of an electronic device according to one or more embodiments of the present disclosure.

FIG. 3 is a block diagram of the electronic device DD according to one or more embodiments of the present disclosure.

Referring to FIG. 3, the electronic device DD includes a display panel DP, a panel driver (also referred to as a driving circuit), and a driving controller 100. As an example of the present disclosure, the panel driver includes a data driver 200, a scan driver 300, a light-emitting driver 350, a voltage generator 400, and a readout circuit 500.

The display panel DP may include a display region DA corresponding to the transmissive region TA (see FIG. 1), and a non-display region NDA corresponding to the bezel region BZA (see FIG. 1).

The display panel DP may include a plurality of pixels PX located in the display region DA, and a plurality of sensors FX located in the display region DA. As an example of the present disclosure, each of the plurality of sensors FX may be located between two adjacent pixels PX. The plurality of pixels PX and the plurality of sensors FX may be alternately located in the first and second directions DR1 and DR2. However, the present disclosure is not limited thereto. That is, two or more pixels PX may be located between two sensors FX that are placed adjacent in the first direction DR1 among the plurality of sensors FX, or two or more pixels PX may be located between two sensors FX that are placed adjacent in the second direction DR2 among the plurality of sensors FX.

The display panel DP further includes initialization scan lines SIL1-SILn, compensation scan lines SCL1-SCLn, write scan lines SWL1-SWLn, black scan lines SBL1-SBLn, light-emitting control lines EML1-EMLn, data lines DL1-DLm, and readout lines RL1-RLh.

The initialization scan lines SIL1-SILn, the compensation scan lines SCL1-SCLn, the write scan lines SWL1-SWLn, the black scan lines SBL1-SBLn, and the light-emitting control lines EML1-EMLn extend in the second direction DR2. The initialization scan lines SIL1-SILn, the compensation scan lines SCL1-SCLn, the write scan lines SWL1-SWLn, the black scan lines SBL1-SBLn, and the light-emitting control lines EML1-EMLn are arranged to be spaced apart in the first direction DR1. The data lines DL1-DLm and the readout lines RL1-RLh extend in the first direction DR1 and are arranged to be spaced apart in the second direction DR2.

The plurality of pixels PX are electrically connected to the initialization scan lines SIL1-SILn, the compensation scan lines SCL1-SCLn, the write scan lines SWL1-SWLn, the black scan lines SBL1-SBLn, the light-emitting control lines EML1-EMLn, and the data lines DL1-DLm. For example, each of the plurality of pixels PX may be electrically connected to four scan lines. However, the number of scan lines connected to respective pixels PX is not limited thereto.

The plurality of sensors FX are electrically connected to the readout lines RL1-RLh. One sensor FX may be electrically connected to one scan line, for example, one of the write scan lines SWL1-SWLn. However, the present disclosure is not limited thereto. The number of scan lines connected to each sensor FX may vary.

As an example of the present disclosure, the number of the readout lines RL1-RLh may correspond to half the number of the data lines DL1-DLm. However, the present disclosure is not limited thereto. Alternatively, the number of the readout lines RL1-RLh may correspond to one-fourth or one-eighth of the number of the data lines DL1-DLm.

The driving controller 100 receives an image signal RGB and a control signal CTRL. The driving controller 100 generates an image data signal DATA in which the data format of the image signal RGB is converted to match the data driver 200 in interface specification. The driving controller 100 outputs a first control signal SCS, a second control signal ECS, a third control signal DCS, and a fourth control signal RCS.

In addition, the driving controller 100 may receive a mode control signal MCS. The mode control signal MCS may be provided from a processor. However, this is presented only as an example, and the mode control signal MCS provided from a processor may be provided to the readout circuit 500.

The driving controller 100 may work in a first mode for sensing a fingerprint, or may work in a second mode for sensing blood pressure, according to information included in the mode control signal MCS. The second mode for sensing blood pressure may be a sensing mode. That is, the pixel PX and sensor FX are controlled by the driving controller 100, and may work in the first mode for sensing a fingerprint or in the second mode for sensing blood pressure.

The data driver 200 receives the third control signal DCS and the image data signal DATA from the driving controller 100. The data driver 200 may convert the image data signal DATA into data signals, and may output the data signals to a plurality of data lines DL1 to DLm which will be described later. The data signals are analog voltages corresponding to the grayscale value of the image data signal DATA.

The scan driver 300 receives the first control signal SCS from the driving controller 100. The scan driver 300 may output scan signals to scan lines in response to the first control signal SCS. For example, in response to the first control signal SCS, the scan driver 300 may output initialization scan signals to the initialization scan lines SIL1-SILn, and may output compensation scan signals to the compensation scan lines SCL1-SCLn. In addition, in response to the first control signal SCS, the scan driver 300 may output write scan signals to the write scan lines SWL1-SWLn, and may output black scan signals to the black scan lines SBL1-SBLn.

The scan driver 300 may be located in the non-display region NDA of the display panel DP. However, the present disclosure is not particularly limited thereto. For example, at least a portion of the scan driver 300 may be located in the display region DA.

The light-emitting driver 350 may be located in the non-display region NDA of the display panel DP. The light-emitting driver 350 receives the second control signal SCS from the driving controller 100. The light-emitting driver 350 may output light-emitting control signals to the light-emitting control lines EML1-EMLn in response to the second control signal ECS. Alternatively, the scan driver 300 may be connected to the light-emitting control lines EML1-EMLn. In this case, the light-emitting driver 350 may be omitted, and the scan driver 300 may output light-emitting control signals to the light-emitting control lines EML1-EMLn.

The voltage generator 400 generates voltages required for the operation of the display panel DP. In one or more embodiments, the voltage generator 400 generates a first driving voltage ELVDD, a second driving voltage ELVSS, a first initialization voltage VINT1, a second initialization voltage VINT2, and a reset voltage Vrst.

The readout circuit 500 receives the fourth control signal RCS from the driving controller 100. The readout circuit 500 may receive sensing signals from the readout lines RL1-RLh in response to the fourth control signal RCS. The readout circuit 500 may process detection signals received from the readout lines RL1-RLh, and may provide the processed detection signals S_FS to the driving controller 100.

The readout circuit 500 may provide a reset control signal RST to the sensor FX through a reset control line RCL. For example, the reset control signal RST is provided to a reset transistor ST1 (see FIG. 4A) of the sensor FX to turn on the reset transistor ST1 (see FIG. 4A).

Figure 4A:
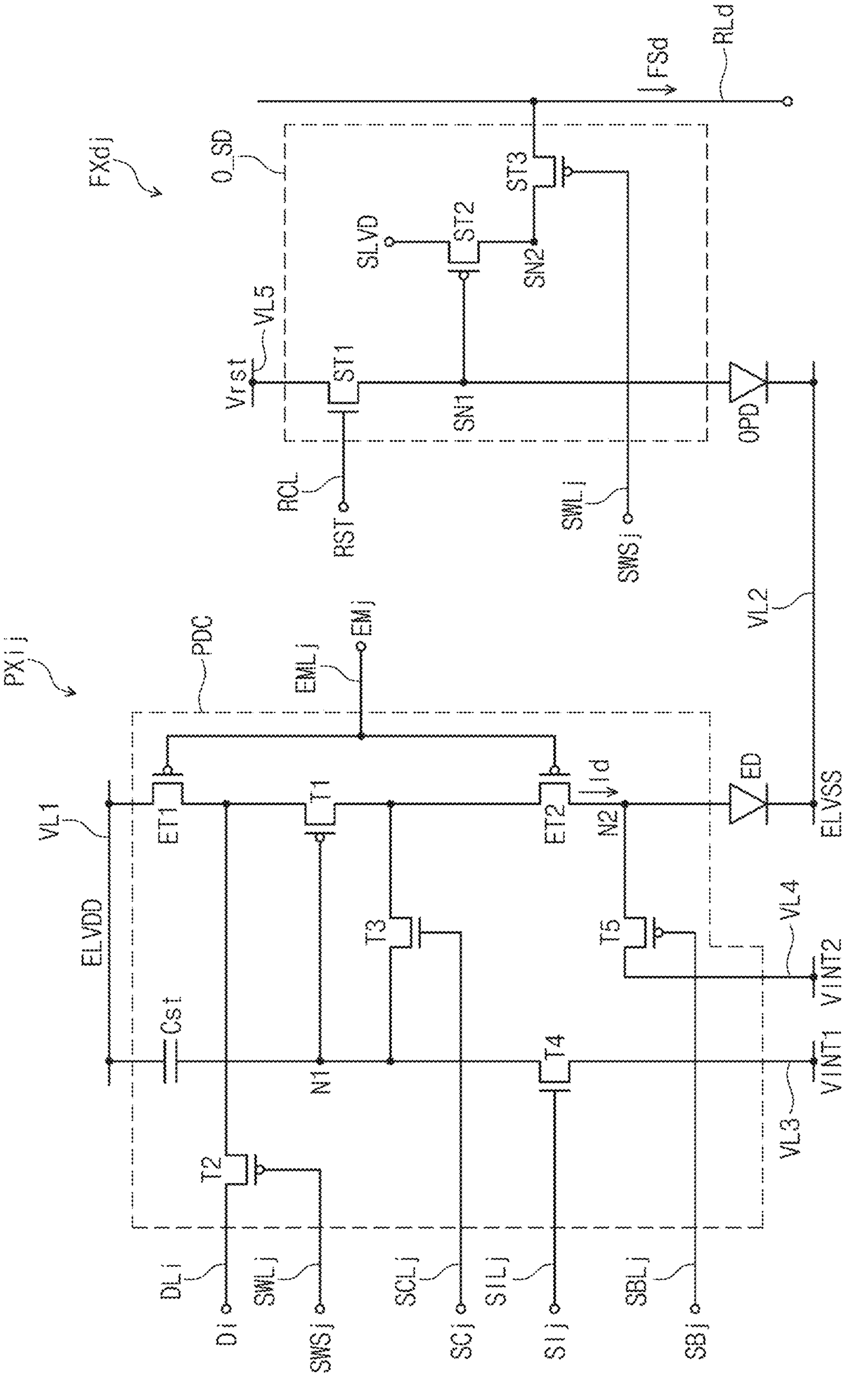
FIG. 4A is an equivalent circuit diagram of a pixel and a sensor according to one or more embodiments of the present disclosure.

FIG. 4A is an equivalent circuit diagram of a pixel PXij and a sensor FXdj according to one or more embodiments of the present disclosure.

FIG. 4A shows an equivalent circuit diagram of one pixel PXij among the plurality of pixels PX (see FIG. 3). The plurality of pixels PX each share the same circuit structure, and thus detailed descriptions of the other pixels PX will not be given as the descriptions of the circuit structure of the pixel PXij are replaced. In addition, FIG. 4A shows an equivalent circuit diagram of one sensor FXdj among the plurality of sensors FX shown in FIG. 3. Because each of the plurality of sensors FX share the same circuit structure, detailed descriptions of the other sensors will not be provided as the above-descriptions of the circuit structure of the sensor FXdj are replaced.

Referring to FIGS. 3 and 4A, the pixel PXij is electrically connected to an i-th data line DLi among the data lines DL1-DLm, to a j-th initialization scan line SILj among the initialization scan lines SIL1-SILn, to a j-th compensation scan line SCLj among the compensation scan lines SCL1-SCLn, to a j-th write scan line SWLj among the write scan lines SWL1-SWLn, to a j-th black scan line SBLj among the black scan lines SBL1-SBLn, and to a j-th light-emitting control line EMLj among the light-emitting control lines EML1-EMLn.

The pixel PXij includes a light-emitting element ED and a pixel-driving circuit PDC. The light-emitting element ED may be a light-emitting diode. As an example of the present disclosure, the light-emitting element ED may be an organic light-emitting diode including an organic emission layer, but is not particularly limited thereto.

The pixel-driving circuit PDC includes first to fifth transistors T1, T2, T3, T4, and T5, first and second light-emitting control transistors ET1 and ET2, and one capacitor Cst.

At least one of the first to fifth transistors T1, T2, T3, T4, or T5 or the first or second light-emitting control transistors ET1 or ET2 may be a transistor having a low-temperature polycrystalline silicon (LTPS) semiconductor layer. At least one of the first to fifth transistors T1, T2, T3, T4, or T5 or the first and second light-emitting control transistors ET1 or ET2 may be a transistor having an oxide semiconductor layer. For example, the third and fourth transistors T3 and T4 may be oxide semiconductor transistors, and the first, second, and fifth transistors T1, T2, and T5, and the first and second light-emitting control transistors ET1 and ET2 may be LTPS transistors.

For example, the first transistor T1 that directly affects the brightness of the electronic device DD is configured to include a semiconductor layer formed of polycrystalline silicon having high reliability, and accordingly, a high resolution display device may be obtained. Meanwhile, the oxide semiconductor has high carrier mobility and low leakage current, and accordingly does not have a significant voltage drop even with long driving time. That is, the color change of images according to the voltage drop is not drastic even upon low-frequency driving, and thus low-frequency driving is allowed. As described above, the oxide semiconductor provides a benefit of low leakage current, and thus at least one of the third transistor T3 or the fourth transistor T4 connected to a gate electrode of the first transistor T1 may be employed as an oxide semiconductor to reduce or prevent the leakage current that may flow to the gate electrode and to reduce power consumption.

One or more of the first to fifth transistors T1, T2, T3, T4, or T5 or the first and second light-emitting control transistors ET1 or ET2 may be P-type transistors, and one or more others may be N-type transistors. For example, the first transistor T1, the second transistor T2, and the fifth transistor T5, and the first and second light-emitting control transistors ET1 and ET2 may be P-type transistors, and the third and fourth transistors T3 and T4 may be N-type transistors.

The configuration of the pixel-driving circuit PDC according to one or more embodiments of the present disclosure is not limited to the one or more embodiments corresponding to FIG. 4A. The pixel-driving circuit PDC shown in FIG. 4A is merely an example, and the configuration of the pixel-driving circuit PDC may be modified and carried out. For example, the first to fifth transistors T1, T2, T3, T4, and T5 and the first and second light-emitting control transistors ET1 and ET2 may all be P-type transistors or N-type transistors.

The j-th initialization scan line SILj, the j-th compensation scan line SCLj, the j-th write scan line SWLj, the j-th black scan line SBLj, and the j-th light-emitting control line EMLj may transmit the j-th initialization scan signal SIj, the j-th compensation scan signal SCj, the j-th write scan signal SWSj, the j-th black scan signal SBj, and the j-th light-emitting control signal EMj to the pixel PXij, respectively. The i-th data line DLi transmits an i-th data signal Di to the pixel PXij. The i-th data signal Di may have a voltage level corresponding to the image signal RGB input to the electronic device DD.

The first and second driving voltage lines VL1 and VL2 may transmit a first driving voltage ELVDD and a second driving voltage ELVSS to the pixel PXij, respectively. In addition, the first and second initialization voltage lines VL3 and VL4 may transmit the first initialization voltage VINT1 and the second initialization voltage VINT2 to the pixel PXij, respectively.

The first transistor T1 is electrically connected between the first driving voltage line VL1 receiving the first driving voltage ELVDD and the light-emitting element ED. The first transistor T1 may include a first electrode connected to the first driving voltage line VL1 via the first light-emitting control transistor ET1, a second electrode connected to an anode AE (see FIG. 4B) of the light-emitting element ED via the second light-emitting control transistor ET2, and a third electrode (e.g., a gate electrode) connected to one end of the capacitor Cst (e.g., at a first node N1). The first transistor T1 may receive the i-th data signal Di received from the i-th data line DLi according to the switching operation of the second transistor T2, and may supply a driving current Id to the light-emitting element ED.

The second transistor T2 is electrically connected between the data line DLi and the first electrode of the first transistor T1. The second transistor T2 includes a first electrode connected to the data line DLi, a second electrode connected to the first electrode of the first transistor T1, and a third electrode (e.g., a gate electrode) connected to the j-th write scan line SWLj. The second transistor T2 may be turned on according to the write scan signal SWSj received through the j-th write scan line SWLj to transmit the i-th data signal Di received through the i-th data line DLi to the first electrode of the first transistor T1.

The third transistor T3 is electrically connected between the second electrode of the first transistor T1 and the first node N1. The third transistor T3 includes a first electrode connected to the third electrode of the first transistor T1, a second electrode connected to the second electrode of the first transistor T1, and a third electrode (e.g., a gate electrode) connected to the j-th compensation scan line SCLj. The third transistor T3 may be turned on according to the j-th compensation scan signal SCj received through the j-th compensation scan line SCLj to connect the third electrode and the second electrode of the first transistor T1, thereby connecting the first transistor T1 in the form of a diode.

The fourth transistor T4 is electrically connected between the first initialization voltage line VL3 to which the first initialization voltage VINT1 is applied and the first node N1. The fourth transistor T4 includes a first electrode connected to the first initialization voltage line VL3 to which the first initialization voltage VINT1 is applied, a second electrode connected to the first node N1, and a third electrode (e.g., a gate electrode) connected to the j-th initialization scan line SILj. The fourth transistor T4 is turned on according to the j-th initialization scan signal SIj received through the j-th initialization scan line SILj. The turned-on fourth transistor T4 delivers the first initialization voltage VINT1 to the first node N1 to initialize the potential of the third electrode of the first transistor T1 (e.g., the potential of the first node N1).

The first light-emitting control transistor ET1 includes a first electrode connected to the first driving voltage line VL1, a second electrode connected to the first electrode of the first transistor T1, and a third electrode (e.g., a gate electrode) connected to the j-th light-emitting control line EMLj.

The second light-emitting control transistor ET2 includes a first electrode connected to the second electrode of the first transistor T1, a second electrode connected to an anode AE (see FIG. 4B) of the light-emitting element ED, and a third electrode (e.g., a gate electrode) connected to the j-th light-emitting control line EMLj.

The first and second light-emitting control transistors ET1 and ET2 are turned on together according to the j-th light-emitting control signal EMj received through the j-th light-emitting control line EMLj. The first driving voltage ELVDD applied through the turned-on first light-emitting control transistor ET1 may be compensated through the diode-connected first transistor T1 and then delivered to the light-emitting element ED.

The fifth transistor T5 includes a first electrode connected to the second initialization voltage line VL4 to which the second initialization voltage VINT2 is delivered, a second electrode connected to the second electrode of the second light-emitting control transistor ET2, and a third electrode (e.g., a gate electrode) connected to the j-th black scan line SBLj. The second initialization voltage VINT2 may have a voltage level equal to or lower than the first initialization voltage VINT1.

As described above, one end of the capacitor Cst is connected to the third electrode of the first transistor T1, and the other end thereof is connected to the first driving voltage line VL1. A cathode CE (see FIG. 4B) of the light-emitting element ED may be connected to the second driving voltage line VL2 that delivers the second driving voltage ELVSS. The second driving voltage ELVSS may have a lower voltage level than the first driving voltage ELVDD.

The sensor FX is electrically connected to a d-th readout line RLd among the readout lines RL1-RLh, to the j-th write scan line SWLj (or referred to as an output control line), and to the reset control line RCL. The sensor FX includes a light detection element OPD (e.g., a detection element) and a sensor-driving circuit O_SD.

The light detection element OPD may be a photodiode. As an example of the present disclosure, the light detection element OPD may be an organic photo-diode including an organic material as a photoelectric conversion layer. An anode AE1, (see FIG. 4B) of the light detection element OPD may be connected to a first sensing node SN1, and the cathode CE (see FIG. 4B) of the light detection element OPD may be connected to the second driving voltage line VL2 for delivering the second driving voltage ELVSS. In FIG. 4A, the sensor FXdj is shown to include one light detection element OPD, but is not particularly limited thereto. For example, the sensor FX may include z light detection elements connected in parallel (z may be an integer of 2 or greater).

The sensor-driving circuit O_SD includes three transistors ST1, ST2, and ST3. The three transistors ST1, ST2, and ST3 may be a reset transistor ST1, an amplification transistor ST2, and an output transistor ST3. At least one of the reset transistor ST1, the amplification transistor ST2, or the output transistor ST3 may be an oxide semiconductor transistor. As an example of the present disclosure, the reset transistor ST1 may be an oxide semiconductor transistor, and the amplification transistor ST2 and the output transistor ST3 may be LTPS transistors. However, the present disclosure is not limited thereto, and at least the reset transistor ST1 or the output transistor ST3 may be oxide semiconductor transistors, and the amplification transistor ST2 may be an LTPS transistor.

In addition, one or more of the reset transistor ST1, the amplification transistor ST2, or the output transistor ST3 may be P-type transistors, and one or more others may be N-type transistors. As an example of the present disclosure, the amplification transistor ST2 and the output transistor ST3 may be P-type transistors, and the reset transistor ST1 may be an N-type transistor. However, the present disclosure is not limited thereto, and the reset transistor ST1, the amplification transistor ST2, and the output transistor ST3 may all be N-type transistors or may all be P-type transistors.

The circuit configuration of the sensor-driving circuit O_SD according to one or more embodiments of the present disclosure is not limited to what is shown in FIG. 4A. The sensor-driving circuit O_SD shown in FIG. 4A is merely an example, and the configuration of the sensor-driving circuit O_SD may be modified.

The reset transistor ST1 includes a first electrode connected to the third initialization voltage line VL5 to receive a reset voltage Vrst, a second electrode connected to the first sensing node SN1, and a third electrode to receive a reset control signal RST. The reset transistor ST1 may reset the potential of the first sensing node SN1 to the reset voltage Vrst in response to the reset control signal RST. The reset control signal RST may be a signal provided through the reset control line RCL.

The amplification transistor ST2 includes a first electrode for receiving a sensing driving voltage SLVD, a second electrode connected to the second sensing node SN2, and a third electrode connected to the first sensing node SN1. The amplification transistor ST2 may be turned on according to the potential of the first sensing node SN1 to apply a sensing driving voltage SLVD to the second sensing node SN2. As an example of the present disclosure, the sensing driving voltage SLVD may be one of the first driving voltage ELVDD, the first initialization voltage VINT1, or the second initialization voltage VINT2. If the sensing driving voltage SLVD is the first driving voltage ELVDD, the first electrode of the amplification transistor ST2 may be electrically connected to the first driving voltage line VL1. If the sensing driving voltage SLVD is the first initialization voltage VINT1, the first electrode of the amplification transistor ST2 may be electrically connected to the first initialization voltage line VL3. If the sensing driving voltage SLVD is the second initialization voltage VINT2, the first electrode of the amplification transistor ST2 may be electrically connected to the second initialization voltage line VL4.

The output transistor ST3 includes a first electrode connected to the second sensing node SN2, a second electrode connected to the d-th readout line RLd, and a third electrode for receiving an output control signal. The output transistor ST3 may deliver a sensing signal FSd to the d-th readout line RLd in response to the output control signal. The output control signal may be the j-th write scan signal SWSj (or referred to as a j-th output control signal) supplied through the j-th write scan line SWLj. That is, the output transistor ST3 may receive the j-th write scan signal SWSj supplied from the j-th write scan line SWLj as an output control signal.

The reset period may be defined as an active duration (e.g., a high level duration) of the reset control line RCL. When a high level reset control signal RST is supplied through the reset control line RCL, the reset transistor ST1 is turned on. Alternatively, when the reset transistor ST1 is formed of a PMOS transistor, a low level reset control signal RST may be supplied to the reset control line RCL over the reset duration. Over the reset duration, the first sensing node SN1 may be reset to a potential corresponding to the reset voltage Vrst. As an example of the present disclosure, the reset voltage Vrst may have a lower voltage level than the second driving voltage ELVSS.

The light detection element OPD of the sensor FX may be exposed to light during a light-emitting period of the light-emitting element ED. The light-emitting period may be referred to as a light-receiving period EIT (see FIG. 9) of the sensor FX. The voltage of the first sensing node SN1 may remain as the reset voltage Vrst in the reset period, and as the light detection element OPD is exposed to light, the voltage of the first sensing node SN1 may gradually shift to the second driving voltage ELVSS. The amplification transistor ST2 may be a source follower amplifier that generates a source-drain current in proportion to an electric charge of the first sensing node SN1 input to the third electrode.

In an output period, the j-th write scan signal SWSj at a low level is supplied to the output transistor ST3 through the j-th write scan line SWLj. When the output transistor ST3 is turned on in response to the j-th write scan signal SWSj at a low level, the sensing signal FSd corresponding to the current flowing through the amplification transistor ST2 may be output to the d-th readout line RLd.

Figure 4B:
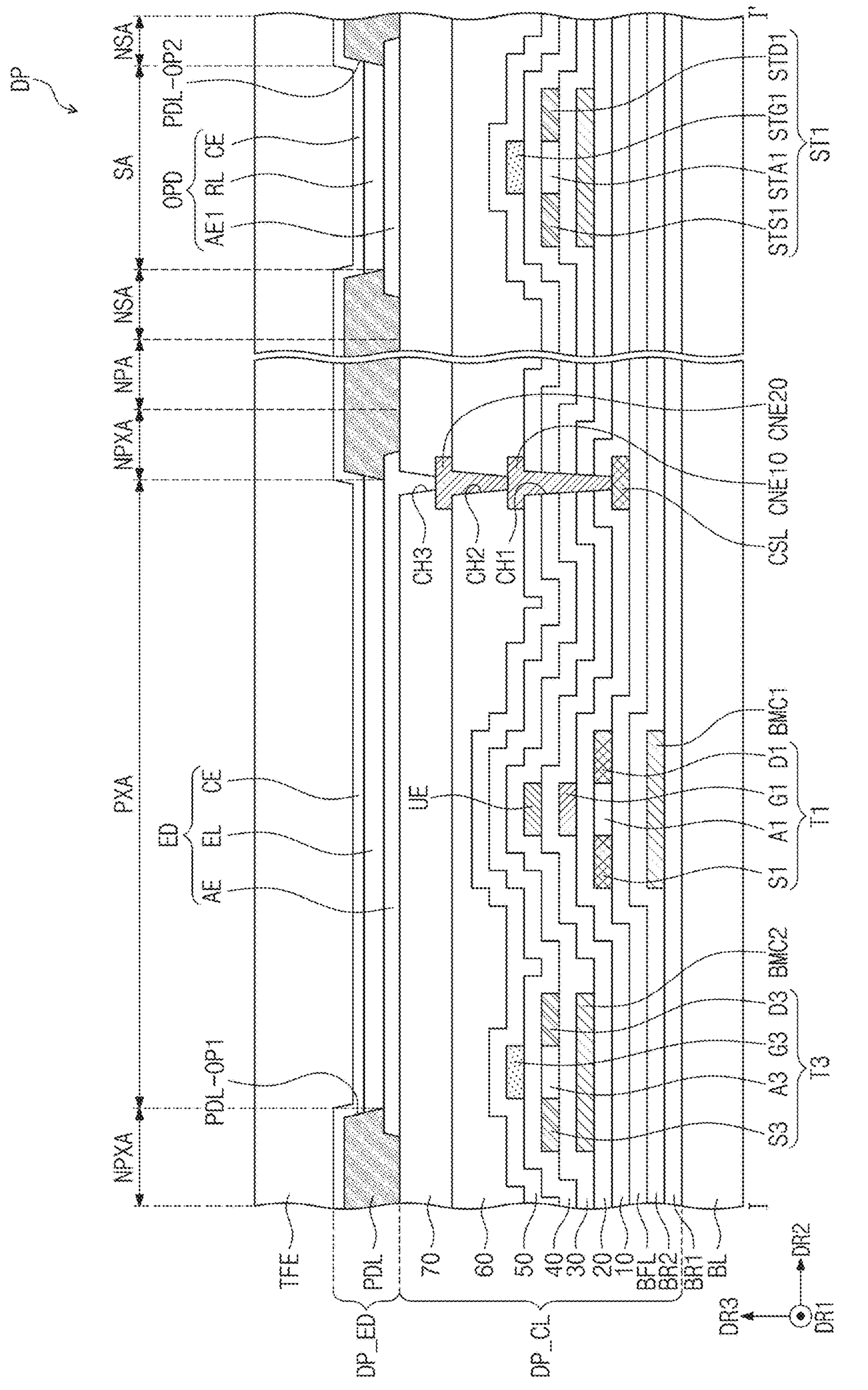
FIG. 4B is a cross-sectional view of a display panel according to one or more embodiments of the present disclosure.

FIG. 4B is a cross-sectional view of the display panel taken along the line I-I' of FIG. 3 according to one or more embodiments of the present disclosure.

Referring to FIGS. 4A and 4B, the display panel DP may include a base layer BL, a circuit layer DP_CL located on the base layer BL (as used herein, “located on” may mean “above”), an element layer DP_ED, and an encapsulation layer TFE.

At least one inorganic layer is formed on an upper surface of the base layer BL. The inorganic layer may include at least one among aluminum oxide, titanium oxide, silicon oxide, silicon oxynitride, zirconium oxide, and/or hafnium oxide. The inorganic layer may be formed as multiple layers. The multi-layered inorganic layers may constitute barrier layers BR1 and BR2 and/or a buffer layer BFL, which will be described later. The barrier layers BR1 and BR2 and the buffer layer BFL may be selectively located.

The barrier layers BR1 and BR2 reduce or prevent foreign substances from being introduced from the outside. The barrier layers BR1 and BR2 may include a silicon oxide layer and a silicon nitride layer. Each of these may be provided in plurality, and silicon oxide layers and silicon nitride layers may be alternately stacked.

The barrier layers BR1 and BR2 may include a first barrier layer BR1 and a second barrier layer BR2. A first rear metal layer BMC1 may be located between the first barrier layer BR1 and the second barrier layer BR2. In one or more embodiments of the present disclosure, the first rear metal layer BMC1 may not be provided.

The buffer layer BFL may be located on the barrier layers BR1 and BR2. The buffer layer BFL increases the bonding force between the base layer BL and semiconductor patterns and/or conductive patterns. The buffer layer BFL may include a silicon oxide layer and a silicon nitride layer. Silicon oxide layers and silicon nitride layers may be alternately stacked.

A first semiconductor pattern may be located on the buffer layer BFL. The first semiconductor pattern may include a silicon semiconductor. For example, the silicon semiconductor may include amorphous silicon, polycrystalline silicon, or the like. For example, the first semiconductor pattern may include low-temperature polysilicon.

FIG. 4B shows only a portion of the first semiconductor pattern located on the buffer layer BFL, and another portion of the first semiconductor pattern may be further located in another region. The first semiconductor pattern may be arranged by corresponding rules over pixels. The first semiconductor pattern may have different electrical properties according to with/without doping. The first semiconductor pattern may include a first region having high conductivity, and a second region having low conductivity. The first region may be doped with an N-type dopant or a P-type dopant. A P-type transistor may include a doped region doped with the P-type dopant, and a N-type transistor may include a doped region doped with the N-type dopant. The second region may be a non-doped region or may be doped in a lower concentration than the first region.

The first region has greater conductivity than the second region, and may substantially serve as an electrode or a signal line. The second region may substantially correspond to an active region (or a channel) of the transistor. That is, a portion of the semiconductor pattern may be an active region of the transistor, another portion may be a source or drain of the transistor, and the other portion may be a connection electrode or a connection signal line.

A first electrode S1, a channel portion A1, and a second electrode D1 of a first transistor T1 are formed from the first semiconductor pattern. The first electrode S1 and the second electrode D1 of the first transistor T1 respectively extend in opposite directions from the channel portion A1.

A portion of a connection signal line CSL formed from the first semiconductor pattern is shown in FIG. 4B. In one or more embodiments, the connection signal line CSL may be connected to the second electrode of the fifth transistor T5 (see FIG. 4A) when viewed on a plane.

A first insulating layer 10 may be located on the buffer layer BFL. A first insulating layer 10 may commonly overlap a plurality of pixels, and may cover the first semiconductor pattern. The first insulating layer 10 may be an inorganic layer and/or an organic layer, and may have a single-layered or multi-layered structure. The first insulating layer 10 may include at least one of aluminum oxide, titanium oxide, silicon oxide, silicon nitride, silicon oxynitride, zirconium oxide, or hafnium oxide. The first insulating layer 10 may be a single-layered silicon oxide layer. Insulating layers of the circuit layer DP_CL which will be described later in addition to the first insulating layer 10 may be inorganic layers and/or organic layers, and may have single-layer or multi-layer structures. The inorganic layer may include at least one of the materials described above, but is not limited thereto.

A third electrode G1 of the first transistor T1 is located on the first insulating layer 10. The third electrode G1 may be a portion of a metal pattern. The third electrode G1 of the first transistor T1 overlaps the channel portion A1 of the first transistor T1. In the process of doping the first semiconductor pattern, the third electrode G1 of the first transistor T1 may serve as a mask. The third electrode G1 may include titanium (Ti), silver (Ag), silver-containing alloy, molybdenum (Mo), molybdenum-containing alloy, aluminum (Al), aluminum-containing alloy, aluminum nitride (AlN), tungsten (W), tungsten nitride (WN), copper (Cu), indium tin oxide (ITO), indium zinc oxide (IZO), and the like, but is not particularly limited thereto.

A second insulating layer 20 may be located on the first insulating layer 10, and may cover the third electrode G1 of the first transistor T1. The second insulating layer 20 may be an inorganic layer and/or an organic layer, and may have a single-layered or multi-layered structure. The second insulating layer 20 may include at least one of silicon oxide, silicon nitride, or silicon oxynitride. The second insulating layer 20 may have a multi-layer structure including a silicon oxide layer and a silicon nitride layer.

An upper electrode UE and a second rear metal layer BMC2 may be located on the second insulating layer 20. The upper electrode UE may overlap the third electrode G1. The upper electrode UE may be a portion of a metal pattern. A portion of the third electrode G1 and the upper electrode UE overlapping the portion may define the capacitor Cst (see FIG. 4A). In one or more embodiments of the present disclosure, the second insulating layer 20 may be replaced with an insulating pattern. In this case, the upper electrode UE may be located on the insulating pattern, and the upper electrode UE may serve as a mask for forming an insulating pattern from the second insulating layer 20.

The second rear metal layer BMC2 may correspond to a lower portion of an oxide thin film transistor, for example, a third transistor T3. The second rear metal layer BMC2 may receive a constant voltage or a signal.

A third insulating layer 30 may be located on the second insulating layer 20, and may cover the upper electrode UE and the second rear metal layer BMC2. The third insulating layer 30 may have a single-layered or multi-layered structure. For example, the third insulating layer 30 may have a multi-layer structure including a silicon oxide layer and a silicon nitride layer.

A second semiconductor pattern may be located on the third insulating layer 30. The first semiconductor pattern may include an oxide semiconductor. The oxide semiconductor may include a plurality of regions divided according to whether metal oxides are reduced. A region in which the metal oxides are reduced (hereinafter, a reduction region) has greater conductivity than a region in which the metal oxides are not reduced (hereinafter, a non-reduction region). The reduction region substantially serves as a source/drain of transistors or signal lines. The non-reduction region substantially corresponds to an active region (e.g., a semiconductor region, or a channel) of transistors. That is, a portion of the second semiconductor pattern may be an active region of a transistor, another portion may be a source/drain region of a transistor, and the other portion may be a signal transmission region.

A first electrode S3, a channel portion A3, and a second electrode D3 of a third transistor T3 are formed from the second semiconductor pattern. The first electrode S3 and the second electrode D3 include a metal reduced from a metal oxide semiconductor. The first electrode S3 and the second electrode D3 may extend in opposite directions from the channel portion A3 on a cross section.

A fourth insulating layer 40 may be located on the third insulating layer 30. A fourth insulating layer 40 may commonly overlap a plurality of pixels and cover the second semiconductor pattern. The fourth insulating layer 40 may include at least one of aluminum oxide, titanium oxide, silicon oxide, silicon nitride, silicon oxynitride, zirconium oxide, or hafnium oxide.

A third electrode G3 of the third transistor T3 is located on the fourth insulating layer 40. The third electrode G3 may be a portion of a metal pattern. The third electrode G3 of the third transistor T3 overlaps the channel portion A3 of the third transistor T3. In a process of performing doping with the second semiconductor pattern, the third electrode G3 may serve as a mask. In one or more embodiments of the present disclosure, the fourth insulating layer 40 may be replaced with an insulating pattern.

A fifth insulating layer 50 may be located on the fourth insulating layer 40, and may cover the third electrode G3. The fifth insulating layer 50 may be an inorganic layer.

A first connection electrode CNE10 may be located on the fifth insulating layer 50. The first connection electrode CNE10 may be electrically connected to the connection signal line CSL through a contact hole CH1 passing through the first to fifth insulating layers 10, 20, 30, 40, and 50.

A sixth insulating layer 60 may be located on the fifth insulating layer 50. The sixth insulating layer 60 may be an organic layer. An organic layer may include general polymers (such as benzocyclobutene (BCB), polyimide, hexamethyldisiloxane (HMDSO), polymethylmethacrylate (PMMA), or polystyrene (PS)), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and/or a blend thereof, but is not particularly limited thereto.

A second connection electrode CNE20 may be located on the sixth insulating layer 60. The second connection electrode CNE20 may be electrically connected to the first connection electrode CNE10 through a second contact hole CH2 passing through the sixth insulating layer 60. A seventh insulating layer 70 may be located on the sixth insulating layer 60, and may cover the second connection electrode CNE20. The seventh insulating layer 70 may be an organic layer.

A first electrode layer is located on the circuit layer DP_CL. The pixel-defining film PDL is formed over the first electrode layer. The first electrode layer may include an anode AE of the light-emitting element ED and an anode AE1 of the light detection element OPD. The anode AE of the light-emitting element ED and the anode AE1 of the light detection element OPD are located on the seventh insulating layer 70. The anode AE of the light-emitting element ED may be connected to the second connection electrode CNE20 through a third contact hole CH3 passing through the seventh insulating layer 70.

First and second film openings PDL-OP1 and PDL-OP2 are provided in the pixel-defining film PDL. The first film opening PDL-OP1 exposes at least a portion of the anode AE of the light-emitting element ED. The second film opening PDL-OP2 exposes at least a portion of the anode AE1 of the light detection element OPD.

In one or more embodiments of the present disclosure, the pixel-defining film PDL may further include a black material. The pixel-defining film PDL may further include a black organic dye/pigment, such as carbon black or aniline black. The pixel-defining film PDL may be formed when a blue organic material is mixed with a black organic material. The pixel-defining film PDL may further include a liquid-repellent organic material.

As shown in FIG. 4B, the display panel DP may include a light-emitting region PXA, and a non-light-emitting region NPXA adjacent to the light-emitting region PXA. The non-light-emitting region NPXA may surround the light-emitting region PXA. The light-emitting region PXA is defined to correspond to a portion of the anode AE exposed by first film opening PDL-OP1.

An emission layer EL may be located on the anode AE of the light-emitting element ED. The emission layer EL may be located in a region corresponding to the first film opening PDL-OP1. The emission layer EL may generate colored light (e.g., predetermined colored light). The patterned emission layer EL is described as an example, but a single emission layer may be commonly located in a plurality of light-emitting regions. In this case, the emission layer may generate white light or blue light. In addition, the emission layer may have a multilayer structure referred to as a tandem structure.

The emission layer EL may include a low-molecular organic material or a high-molecular organic material as a light-emitting material. Alternatively, the emission layer EL may include a quantum dot material. The core of a quantum dot may be selected from a Group II-VI compound, a Group III-V compound, a Group IV-VI compound, a Group IV element, a Group IV compound, and/or a combination thereof.

A cathode CE is located on the emission layer EL. As an example of the present disclosure, the cathode CE may be commonly located in the light-emitting region PXA, the non-light-emitting region NPXA, and the non-pixel region NPA. The non-pixel region NPA may be a portion in which the pixel PX is not located.

The circuit layer DP_CL may further include the sensor-driving circuit O_SD (see FIG. 4A). For convenience of description, the reset transistor ST1 of the sensor-driving circuit O_SD is shown. A first electrode STS1, a channel portion STA1, and a second electrode STD1 of a reset transistor ST1 are formed from the second semiconductor pattern. The first electrode STS1 and the second electrode STD1 include a metal reduced from a metal oxide semiconductor. The fourth insulating layer 40 is located to cover the first electrode STS1, the channel portion STA1, and the second electrode STD1 of the reset transistor ST1. The third electrode STG1 of the reset transistor ST1 is located on the fourth insulating layer 40. The third electrode STG1 may be a portion of a metal pattern. The third electrode STG1 of the reset transistor ST1 overlaps the channel portion STA1 of the reset transistor ST1.

As an example of the present disclosure, the reset transistor ST1 may be located on the same layer as the third transistor T3. That is, the first electrode STS1, the channel portion STA1, and the second electrode STD1 of the reset transistor ST1 may be formed through the same process as the first electrode S3, the channel portion A3, and the second electrode D3 of the third transistor T3. The third electrode STG1 of the reset transistor ST1 may be formed with the third electrode G3 of the third transistor T3 through the same process. In one or more embodiments, the first and second electrodes of the amplification transistor ST2 (see FIG. 4A) and the output transistor ST3 (see FIG. 4A) of the sensor-driving circuit O_SD may be formed through the same process as the first electrode S1 and the second electrode D1 of the first transistor T1. The reset transistor ST1 and the third transistor T3 may be formed on the same layer through the same process, and thus an additional process for forming the reset transistor ST1 is not required, thereby reducing process efficiency and costs.

The element layer DP_ED may further include the light detection element OPD. The light detection element OPD may include an anode AE1, a photoelectric conversion layer RL, and a cathode CE. The anode AE1 of the light detection element OPD may be located on the same layer as the anode AE of the light-emitting element ED. That is, the anode AE1 may be located on the circuit layer DP_CL, and may be formed along with the anode AE of the light-emitting element ED through the same process.

The second film opening PDL-OP2 of the pixel-defining film PDL exposes at least a portion of the anode AE1. The photoelectric conversion layer RL is located on the anode AE1 exposed by the second film opening PDL-OP2. The photoelectric conversion layer RL may include an organic photo-sensing material. The cathode CE may be located on the photoelectric conversion layer RL. The anode AE1 and the cathode CE may each receive an electrical signal. The anode AE1 and the cathode CE may receive different signals. Accordingly, an electric field (e.g., predetermined electric field) may be formed between the anode AE1 and the cathode CE. The photoelectric conversion layer RL generates electrical signals corresponding to light incident on a sensor.

The charge generated in the photoelectric conversion layer RL alters the electric field between the anode AE1 and the cathode CE. The amount of charges generated in the photoelectric conversion layer RL may vary depending on whether light is incident on the light detection element OPD, and the amount and intensity of light incident on the light detection element OPD. Accordingly, the electric field formed between the anode AE1 and the cathode CE may vary. The light detection element OPD according to one or more embodiments of the present disclosure may obtain information about users' fingerprint or illuminance through changes in the electric field between the anode AE1 and the cathode CE.

The encapsulation layer TFE is located on the element layer DP_ED. The encapsulation layer TFE includes at least an inorganic layer or an organic layer. In one or more embodiments of the present disclosure, the encapsulation layer TFE may include two inorganic layers and an organic layer located therebetween. In one or more embodiments of the present disclosure, a thin film encapsulation layer may include a plurality of inorganic layers and a plurality of organic layers, which are alternately stacked.

The encapsulation inorganic layer protects the light-emitting element ED and the light detection element OPD from moisture/oxygen, and the encapsulation organic film protects the light-emitting element ED and the light detection element OPD from foreign substances, such as dust particles. The encapsulation inorganic layer may include a silicon nitride layer, a silicon oxy nitride layer, a silicon oxide layer, a titanium oxide layer, an aluminum oxide layer, and the like, but is not particularly limited thereto. The encapsulation organic layer may include an acryl-based organic layer, but is not limited thereto.

Figure 5:
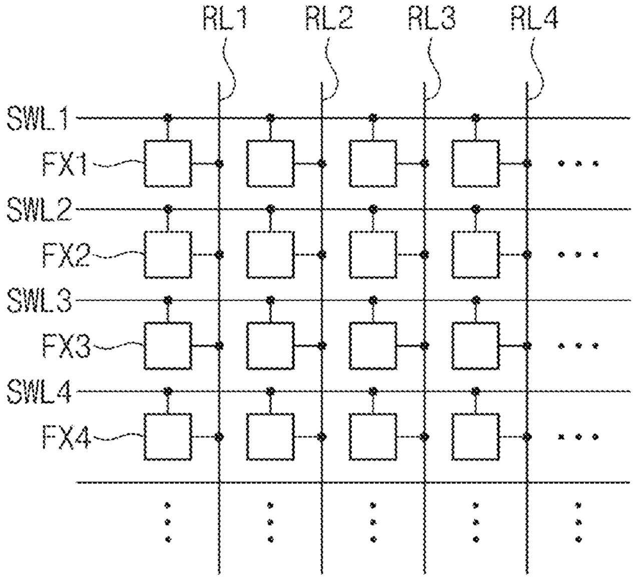
FIG. 5 is a view showing a connection structure between write scan lines and sensors of a display panel according to one or more embodiments of the present disclosure.

FIG. 5 is a view showing a connection structure between write scan lines and sensors of a display panel according to one or more embodiments of the present disclosure.

Referring to FIGS. 3 and 5, in the display region DA, red, green, and blue pixels PX and sensors FX are alternately arranged in a matrix form. The sensors FX respectively receive the write scan signals SWSj through one of the write scan lines SWL1 to SWLn. For example, the sensors FX arranged in (4k−3)-th to 4k-th rows (where k is a natural number) are electrically connected to (4k−3)-th to 4k-th write scan lines, respectively. The sensor FX may include a first row sensor FX1, a second row sensor FX2, a third row sensor FX3, and a fourth row sensor FX4.

Hereinafter, for convenience of description, the (4k−3)-th write scan line is referred to as the first write scan line SWL1, the (4k−2)-th write scan line is referred to as the second write scan line SWL2, the (4k−1)-th write scan line is referred to as the third write scan line SWL3, and the 4k-th write scan line is referred to as the fourth write scan line SWL4. In addition, the sensor FX to which the first write scan line SWL1 is electrically connected is referred to as a plurality of first row sensors FX1, the sensor FX to which the second write scan line SWL2 is electrically connected is referred to as a plurality of second row sensors FX2, the sensor FX to which the third write scan line SWL3 is electrically connected is referred to as a plurality of third row sensors FX3, and the sensor FX to which the fourth write scan line SWL4 is electrically connected is referred to as a plurality of fourth row sensors FX4.

The readout lines RL1 to RLh (see FIG. 4A) may include a first readout line RL1, a second readout line RL2, a third readout line RL3, and a fourth readout line RL4. For example, the first to fourth row sensors FX1, FX2, FX3, and FX4 arranged in the first column may be connected to the first readout line RL1. The first to fourth row sensors FX1, FX2, FX3, and FX4 arranged in the second column may be connected to the second readout line RL2. The first to fourth row sensors FX1, FX2, FX3, and FX4 arranged in the third column may be connected to the third readout line RL3. The first to fourth row sensors FX1, FX2, FX3, and FX4 arranged in the fourth column may be connected to the fourth readout line RL4.

The pixels PX and the sensors FX are arranged in a matrix form. Among these, a first panel sensor FX1 may be electrically connected to the first write scan line SWL1, a second panel sensor FX2 may be electrically connected to the second write scan line SWL2, a third panel sensor FX3 may be electrically connected to the third write scan line SWL3, and a fourth panel sensor FX4 may be electrically connected to the fourth write scan line SWL4. The first to fourth panel sensors FX1, FX2, FX3, and FX4 may be in a repeated arrangement.

Figure 6:
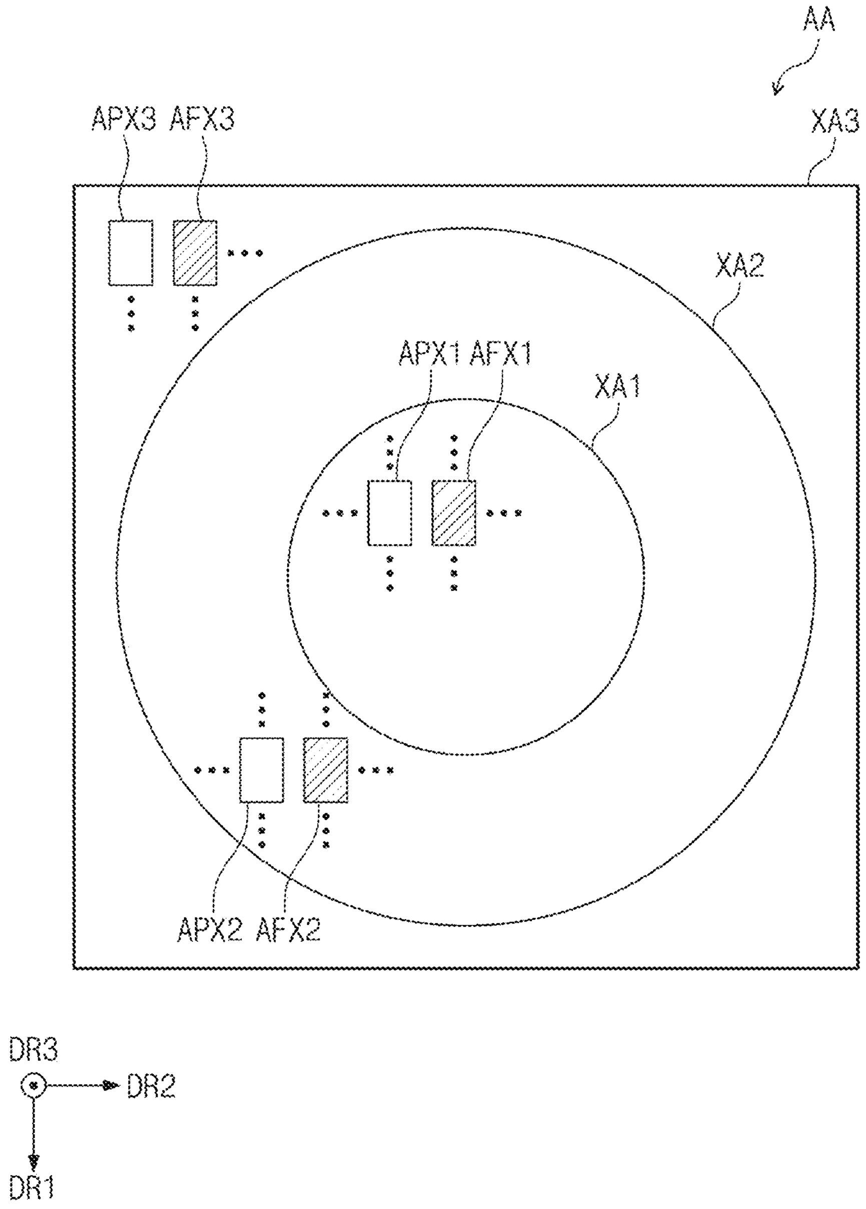
FIG. 6 is a plan view enlarging region AA of FIG. 3 according to one or more embodiments of the present disclosure.

FIG. 6 is a plan view enlarging region AA of FIG. 3 according to one or more embodiments of the present disclosure.

Referring to FIGS. 2, 3, 4A, and 6, the display region DA may include a first region XA1, a second region XA2, and a third region XA3. The first region XA1 may be positioned at the center of region AA. For example, the first region XA1 may have a circular shape. The second region XA2 may be adjacent to the first region XA1 and may surround the first region XA1. For example, the second region XA2 may have a donut shape. The third region XA3 may surround the first region XA1 and the second region XA2.

In FIG. 6, the second region XA2 is shown surrounding the first region XA1 as an example, but as the shape of the first region XA1 changes, the second region XA2 may not surround the first region XA1. For example, a detailed description thereof will be described later.

The pixel PX may include a first pixel APX1, a second pixel APX2, and a third pixel APX3. The sensor FX may include a first sensor AFX1, a second sensor AFX2, and a third sensor AFX3. The first pixel APX1 and the first sensor AFX1 may be located in the first region XA1. The second pixel APX2 and the second sensor AFX2 may be located in the second region XA2. The third pixel APX3 and the third sensor AFX3 may be located in the third region XA3.

A driving controller 100 may cause the display panel DP to work in a sensing mode through a mode control signal MCS. In the sensing mode, the first pixel APX1 and the first sensor AFX1 may be turned on. The light-emitting element ED of the first pixel APX1 may emit first light with a first luminance. The second pixel APX2 may be turned on, and the second sensor AFX2 may be turned off. The light-emitting element ED of the second pixel APX2 may emit second light with a second luminance. The first luminance may be lower than the second luminance. For example, the first luminance may be in a gray level of about 150 to about 200, and the second luminance may be in a gray level of about 255, but the present disclosure is not limited thereto. The third pixel APX3 and the third sensor AFX3 may be turned off, such that the light-emitting element ED of the third pixel APX3 may emit no light.

In the sensing mode, a user's hand US_F (see FIG. 1) may contact the window WM. The second light may be reflected back by blood vessels in the user's hand US_F (see FIG. 1). The reflected second light may be detected by the first sensor AFX1. The first light may be reflected by the upper functional layer UFL and may return. The reflected first light may be detected by the first sensor AFX1. That is, the first sensor AFX1 may detect the first light and the second light to sense blood pressure. The first sensor AFX1 may transmit a readout signal FSd containing information obtained by sensing blood pressure to the readout circuit 500.

According to one or more embodiments of the present disclosure, the first sensor AFX1 may detect the first light of the first pixel APX1 and the second light of the second pixel APX2 to detect blood vessels for sensing blood pressure. Accordingly, an absolute amount of light detected may increase. A DC component of the readout signal FSd received by the first sensor AFX1 may increase. Therefore, the electronic device DD (see FIG. 1) having improved detection reliability may be provided.

Figure 7:
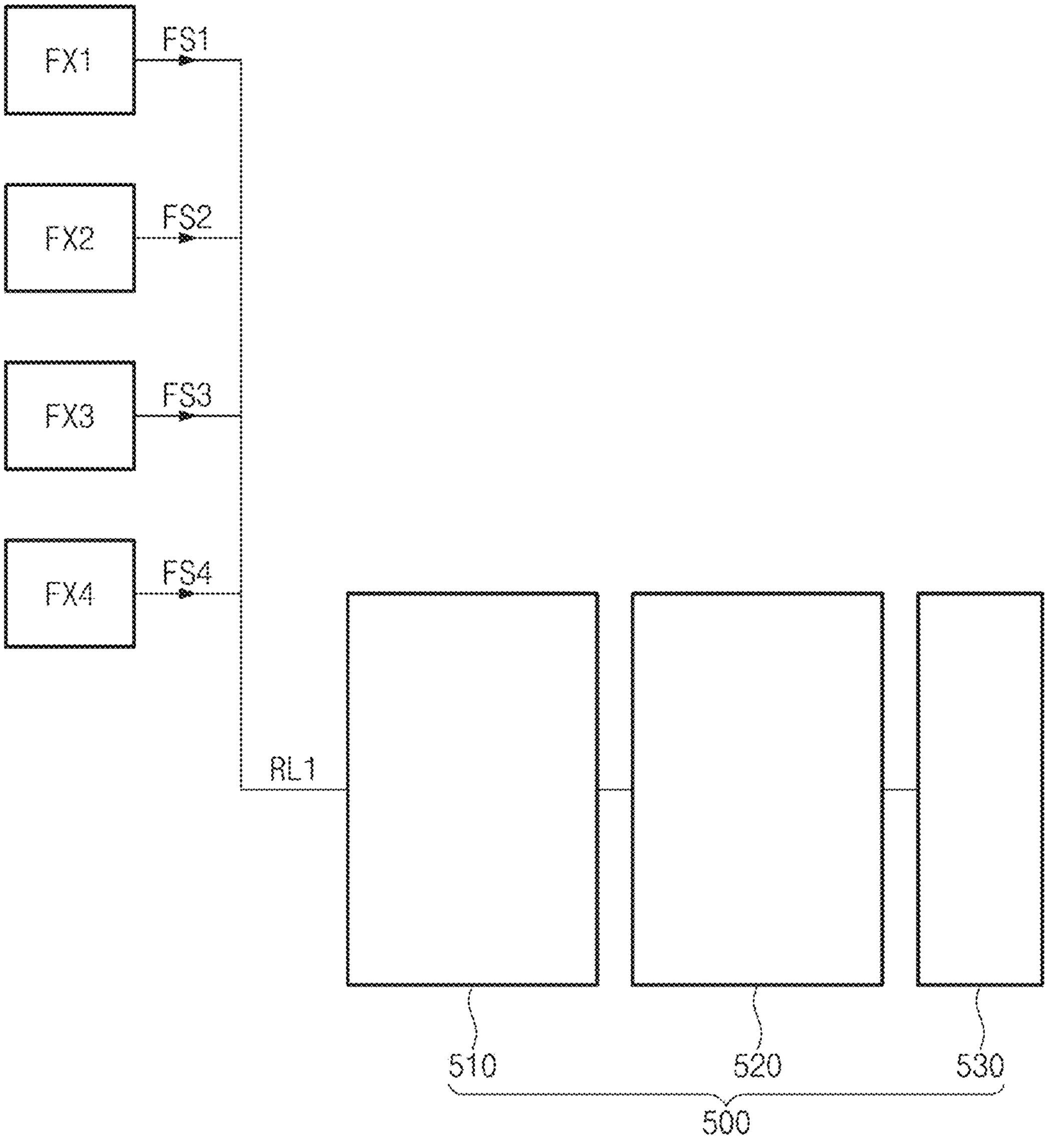
FIG. 7 is a block diagram showing first to fourth row sensors and a readout circuit.
Figure 8:
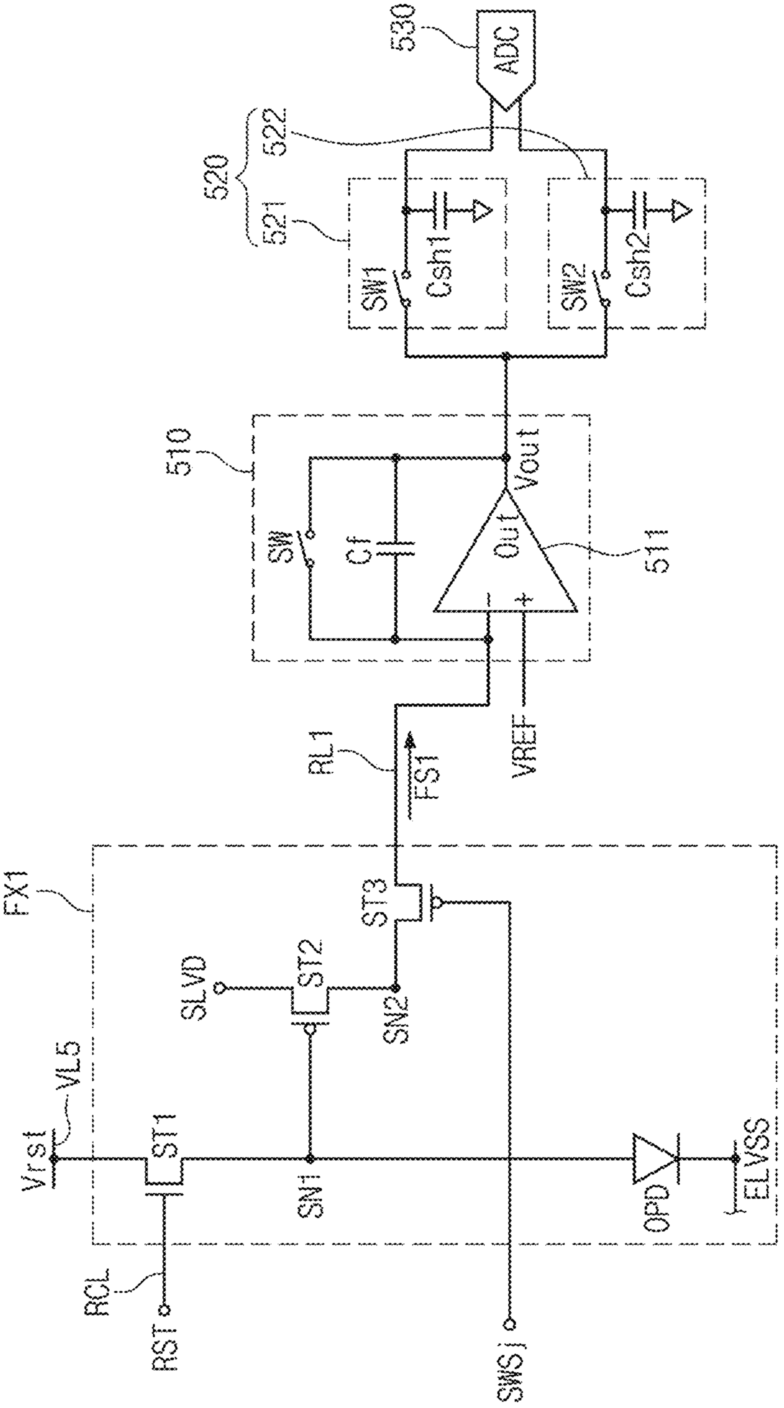
FIG. 8 is a circuit diagram showing a first row sensor and a readout circuit according to one or more embodiments of the present disclosure in detail.

FIG. 7 is a block diagram showing first to fourth row sensors and a readout circuit. FIG. 8 is a circuit diagram showing a first row sensor and a readout circuit according to one or more embodiments of the present disclosure in detail.

Referring to FIGS. 3, 7, and 8, the readout circuit 500 may be connected to the sensor FX through the readout line RLd (see FIG. 4A).

The sensor FX may include a first row sensor FX1, a second row sensor FX2, a third row sensor FX3, and a fourth row sensor FX4. For example, the first to fourth row sensors FX1, FX2, FX3, and FX4 may correspond to the first sensor AFX1 (see FIG. 6) located in the first region XA1 (see FIG. 6).

For example, the readout circuit 500 may be connected to the first to fourth row sensors FX1, FX2, FX3, and FX4 through one first readout line RL1. The first to fourth row sensors FX1, FX2, FX3, and FX4 may transmit readout signals FS1, FS2, FS3, and FS4 to the readout circuit 500 through the first readout line RL1. In FIG. 7, the first readout line RL1 among the readout lines RL1 to RLh (see FIG. 4A) is presented as an example, but other readout lines RL1 to RLh (see FIG. 4A) may be applicable.

The readout circuit 500 may include an amplifier circuit 510, a sample-and-hold portion 520, and an analog-to-digital converter 530.

The amplifier circuit 510 may include an operational amplifier 511, a capacitor Cf, and a switch SW. The operational amplifier 511 may include an inverting input terminal (−), a non-inverting input terminal (+), and an output terminal Out. The first readout line RL1 may be connected to the inverting input terminal, a reference voltage VREF may be input to the non-inverting input terminal, and the output terminal Out may be connected to the sample-and-hold portion 520.

The capacitor Cf may be connected between the inverting input terminal (−) and the output terminal Out, and the switch SW may be connected in parallel to the capacitor Cf. The gain of the operational amplifier 511 may correspond to the capacitance of the capacitor Cf. The capacitor Cf may accumulate the voltage applied through the first readout line RL1 during one frame period. The applied voltage may be a noise signal voltage or a detection signal voltage VC (see FIG. 9). The switch SW serves to control the operation of the capacitor Cf. For example, when the switch SW is turned on, the capacitor Cf may be reset.

The sample-and-hold portion 520 may include a hold portion 521 and a reset portion 522. The hold portion 521 may include a first switch SW1 and a first capacitor Csh1. The reset portion 522 may include a second switch SW2 and a second capacitor Csh2. The sample-and-hold portion 520 may sample an output voltage Vout of the operational amplifier 511 in the first capacitor Csh1 and the second capacitor Csh2, and may hold the sampled output voltage.

The first capacitor Csh1 may be connected to the output terminal Out of the operational amplifier 511 through the first switch SW1. When the first switch SW1 is turned on, the output voltage Vout is charged in the first capacitor Csh1. For example, the first switch SW1 may be turned on at a timing when the readout signals FS1, FS2, FS3, and FS4 flow through the first readout line RL1. Accordingly, the output voltage Vout charged in the first capacitor Csh1 may be a noise signal voltage and the detection signal voltage VC (see FIG. 9).

The second capacitor Csh2 may be connected to the output terminal Out of the operational amplifier 511 through the second switch SW2. When the second switch SW2 is turned on, the output voltage Vout is charged in the second capacitor Csh2. For example, the second switch SW2 may be turned on at a timing when the readout signals FS1, FS2, FS3, and FS4 do not flow through the first readout line RL1. Accordingly, the output voltage Vout charged in the second capacitor Csh2 may be a noise signal voltage.

The analog-to-digital converter 530 may convert a difference between the voltage provided from the hold portion 521 and the voltage provided from the reset portion 522 into a digital value or a digital code. The voltage held in the first capacitor Csh1 and the second capacitor Csh2 may be differentiated to convert the detection signal voltage VC (see FIG. 9) into light-sensing data as digital data, and to output the data. That is, the analog-to-digital converter 530 may generate a digital value or a digital code based on the detected voltage from which noise is removed.

Figure 9:
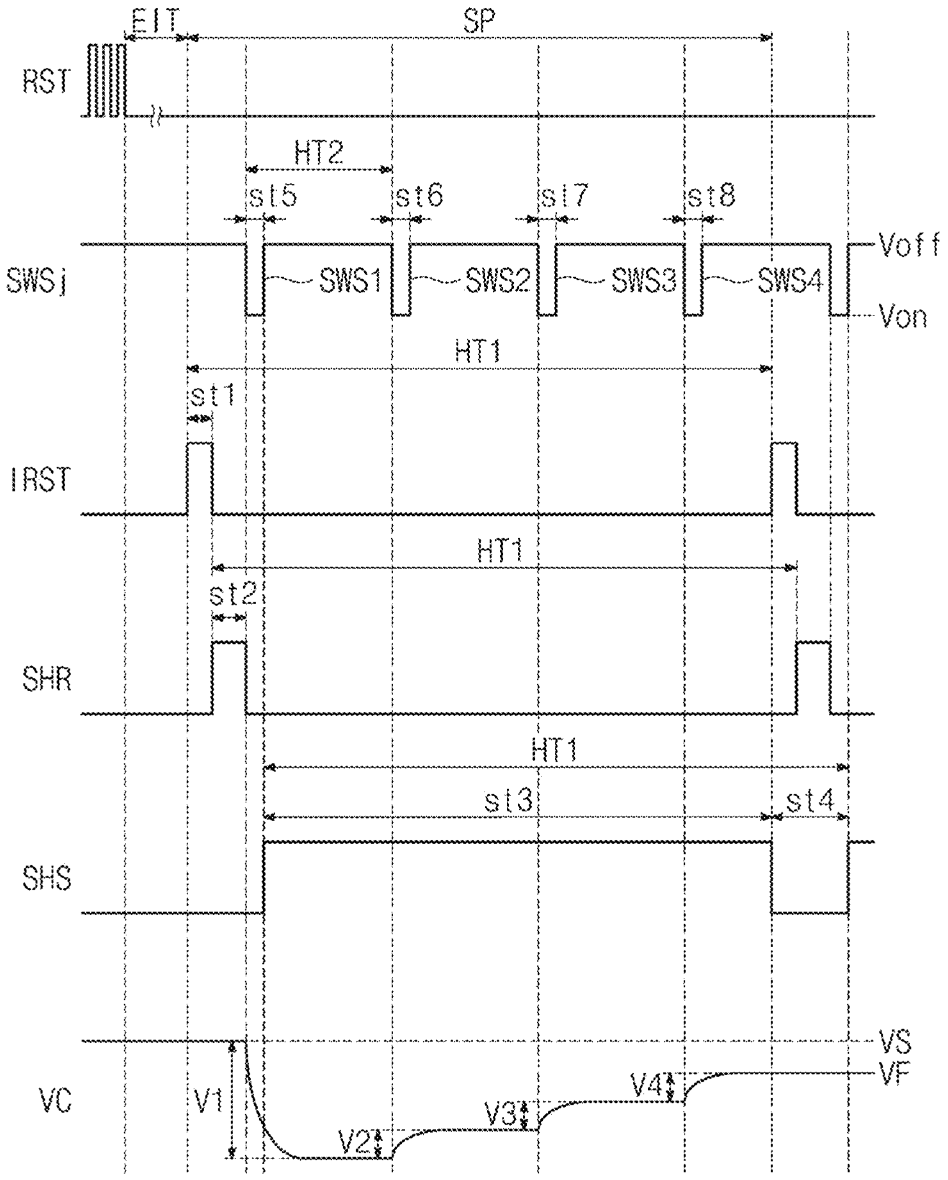
FIG. 9 is a waveform diagram showing signals of a readout circuit and a write scan signal of FIG. 7 according to a sensing period.

FIG. 9 is a waveform diagram showing signals of a readout circuit and a write scan signal of FIG. 7 according to a sensing period.

Referring to FIGS. 6 to 9, operation processes of the switch SW, the first switch SW1, and the second switch SW2 of the readout circuit 500 and operation processes of the write scan signal SWSj of the first to fourth row sensors FX1, FX2, FX3, and FX4 according to a sensing period SP are shown. The write scan signal SWSj may be sequentially provided to the first to fourth row sensors FX1, FX2, FX3, and FX4 as the first to fourth write scan signals SWS1, SWS2, SWS3, and SWS4.

The first to fourth row sensors FX1, FX2, FX3, and FX4 may each receive the reset control signal RST to reset the potential of the first sensing node SN1. Thereafter, the first to fourth row sensors FX1, FX2, FX3, and FX4 may each receive light from the first pixel APX1 and the second pixel APX2 during the light-receiving period EIT. For example, the light-receiving period EIT may be about 8.3 ms (millisecond).

According to one or more embodiments of the present disclosure, during the light-receiving period EIT, the first to fourth row sensors FX1, FX2, FX3, and FX4 may each detect the first light of the first pixel APX1 and the second light of the second pixel APX2. Accordingly, an absolute amount of light detected may increase. The voltage of the first sensing node SN1 may shift to be adjacent to the second driving voltage ELVSS. For example, the second driving voltage ELVSS may be referred to as a ground voltage. A DC component of the readout signal FSd received by the first sensor AFX1 may increase. Therefore, the electronic device DD (see FIG. 1) having improved detection reliability may be provided.

During the sensing period SP, the readout circuit 500 may receive a feedback reset signal IRST, a first sampling signal SHS, a second sampling signal SHR, and first to fourth readout signals FS1, FS2, FS3, and FS4. The readout circuit 500 may sense the detection signal voltage VC according to the first to fourth readout signals FS1, FS2, FS3, and FS4 during the sensing period SP.

The sensing period SP may include a first readout period st1 that resets the capacitor Cf according to the feedback reset signal IRST, a second readout period st2 that holds a voltage in the second capacitor Csh2 according to the second sampling signal SHR, fifth to eighth readout periods st5, st6, st7, and st8 that output readout signals FS1, FS2, FS3, and FS4 generated according to light exposure to the readout circuit 500 based on the write scan signal SWSj, a third readout period st3 that holds the detection signal voltage VC according to the readout signals FS1, FS2, FS3, and FS4 in the first capacitor Csh1 according to the first sampling signal SHS, and a fourth readout period st4 in which the first sampling signal SHS has a turn-off voltage.

The feedback reset signal IRST may control the switch SW. For example, the feedback reset signal IRST has a first horizontal period HT1. That is, an interval between pulses of the feedback reset signal IRST may have the first horizontal period HT1. The feedback reset signal IRST may have a turn-on signal during the first readout period st1 in the first horizontal period HT1. Accordingly, the feedback reset signal IRST may repeat the turn-on signal every first horizontal period HT1.

The feedback reset signal IRST may include the first readout period st1 that turns on the switch SW. The switch SW is turned on during the first readout period st1. Accordingly, both ends of the capacitor Cf may be connected and the capacitor Cf may be reset. In the first readout period st1, the output voltage Vout of the operational amplifier 511 may be equal to an initial voltage VREF of the inverting input terminal (−).

The second sampling signal SHR may control the second switch SW2. For example, the second sampling signal SHR has the first horizontal period HT1. That is, an interval between pulses of the second sampling signal SHR may have the first horizontal period HT1. That is, the feedback reset signal IRST and the second sampling signal SHR may have the same period. The second sampling signal SHR may have a turn-on signal during the second readout period st2 in the first horizontal period HT1. Accordingly, the second sampling signal SHR may repeat the turn-on signal every first horizontal period HT1.

The second sampling signal SHR may include the second readout period st2 that turns on the second switch SW2.

During the second readout period st2, the switch SW is turned off and the second switch SW2 is turned on. Accordingly, the output terminal Out of the operational amplifier 511 may be electrically connected to the second capacitor Csh2. Because the second readout period st2 comes before the second transistor T2 is turned on, a valid signal is not output through the first read out line RL1. Accordingly, a noise signal voltage may be held in the second capacitor Csh2. That is, a voltage in which the noise signal voltage is added to the initial voltage VREF may be held in the second capacitor Csh2.

During the fifth readout period st5, the first write scan signal SWS1 having a gate-on voltage Von is supplied to the first scan write line SWL1. During the fifth readout period st5, the output transistor ST3 of the first row sensor FX1 is turned on by the first write scan signal SWS1. Accordingly, the amplifying transistor ST2 may be connected to the first readout line RL1, and the first readout signal FS1 proportional to the voltage charged in the first node SN1 may be output to the readout circuit 500 through the first readout line RL1. The first readout signal FS1 may be held as a first detection signal voltage V1 at the output terminal Out of the operational amplifier 511. That is, the first readout signal FS1 detected by the first row sensor FX1 may be held as the first detection signal voltage V1 in the amplifier circuit 510.

During the sixth readout period st6, the second write scan signal SWS2 having a gate-on voltage Von is supplied to the second write scan line SWL2. During the sixth readout period st6, the output transistor ST3 of the second row sensor FX2 is turned on by the second write scan signal SWS2. Accordingly, the amplifying transistor ST2 may be connected to the first readout line RL1, and the second readout signal FS2 proportional to the voltage charged in the first node SN1 may be output to the readout circuit 500 through the first readout line RL1. The second readout signal FS2 may be held as a second detection signal voltage V2 at the output terminal Out of the operational amplifier 511. That is, the second readout signal FS2 detected by the second row sensor FX2 may be held as the second detection signal voltage V2 in the amplifier circuit 510. The second detection signal voltage V2 may be accumulated and held in the first detection signal voltage V1.

During the seventh readout period st7, the third write scan signal SWS3 having a gate-on voltage Von is supplied to the third scan write line SWL3. During the seventh readout period st7, the output transistor ST3 of the third row sensor FX3 is turned on by the third write scan signal SWS3. Accordingly, the amplifying transistor ST2 may be connected to the first readout line RL1, and the third readout signal FS3 proportional to the voltage charged in the first node SN1 may be output to the readout circuit 500 through the first readout line RL1. The third readout signal FS3 may be held as a third detection signal voltage V3 at the output terminal Out of the operational amplifier 511. That is, the third readout signal FS3 detected by the third row sensor FX3 may be held as the third detection signal voltage V3 in the amplifier circuit 510. The third detection signal voltage V3 may increase in a direction that is opposite to the first detection signal voltage V1. The third detection signal voltage V3 may be accumulated and held in the first detection signal voltage V1 and the second detection signal voltage V2.

During the eighth readout period st8, the fourth write scan signal SWS4 having a gate-on voltage Von is supplied to the fourth scan write line SWL4. During the eighth readout period st8, the output transistor ST3 of the fourth row sensor FX4 is turned on by the fourth write scan signal SWS4. Accordingly, the amplifying transistor ST2 may be connected to the first readout line RL1, and the fourth readout signal FS4 proportional to the voltage charged in the first node SN1 may be output to the readout circuit 500 through the first readout line RL1. The fourth readout signal FS4 may be held as a fourth detection signal voltage V4 at the output terminal Out of the operational amplifier 511. That is, the fourth readout signal FS4 detected by the fourth row sensor FX4 may be held as the fourth detection signal voltage V4 in the amplifier circuit 510. The fourth detection signal voltage V4 may increase in an opposite direction to the first detection signal voltage V1. The fourth detection signal voltage V4 may be accumulated and held in the first to third detection signal voltages V1, V2, and V3.

FIG. 9 shows receiving a detection signal voltage VC from four sensors during one sensing period SP, but the number of sensors for receiving voltage during the sensing period SP according to one or more embodiments of the present disclosure is not limited thereto. For example, during the sensing period SP, the readout circuit 500 may receive the detection signal voltage VC from two or more sensors.

The write scan signal SWSj has a second horizontal period HT2. The write scan signal SWSj may have a turn-on signal every second horizontal period HT2. That is, the write scan signal SWSj may repeat the turn-on signal every second horizontal period HT2. For example, an interval between pulses of the first write scan signal SWS1 and the second write scan signal SWS2 may have the second horizontal period HT2. In addition, an interval between respective pulses of the second to fourth write scan signals SWS2, SWS3, and SWS4 may have the second horizontal period HT2.

The first sampling signal SHS may control the first switch SW1. For example, the first sampling signal SHS has the first horizontal period HT1. That is, an interval between pulses of the first sampling signal SHS may have the first horizontal period HT1. The first sampling signal SHS may have a turn-on signal during the third readout period st3 in the first horizontal period HT1. Accordingly, the first sampling signal SHS may repeat the turn-on signal every first horizontal period HT1.

The first sampling signal SHS may include the third readout period st3 that turns on the first switch SW1. The first switch SW1 is turned on during the third readout period st3. Accordingly, the output terminal Out of the operational amplifier 511 may be electrically connected to the first capacitor Csh1. First, the output terminal Out of the operational amplifier 511 sensed in the fifth readout period st5 during the third readout period st3 corresponds to the first detection signal voltage V1, and thus the first detection signal voltage V1 may be held in the first capacitor Csh1. Subsequently, the output terminals Out of the operational amplifier 511 sensed in the sixth to eighth readout periods st6, st7, and st8 during the third readout period st3 each correspond to the second to fourth detection signal voltages V2 to V4, and thus the second to fourth detection signal voltages V2, V3, and V4 may be accumulated and held in the first capacitor Csh1.

Accordingly, the first to fourth detection signal voltages V1, V2, V3, and V4 may be sequentially accumulated and held in the first capacitor Csh1 during the third readout period st3. Accordingly, the voltage in which the first to fourth detection signal voltages V1, V2, V3, and V4 are sequentially accumulated may be held as an accumulated detection signal voltage VF. The accumulated detection signal voltage VF may have a voltage level that is lower than a saturation voltage VS. Accordingly, the accumulated detection signal voltage VF may not be saturated.

Unlike what is shown in one or more embodiments of the present disclosure, when signals received from a plurality of sensors are accumulated and output, the accumulated detection signal voltage may become saturated. However, according to one or more embodiments of the present disclosure, during the light-receiving period EIT, the first to fourth row sensors FX1, FX2, FX3, and FX4 may each detect the first light of the first pixel APX1 and the second light of the second pixel APX2.

Accordingly, a DC component of signals may increase, and when the DC component increases, the voltage level of the detection signal voltage VC may decrease. The voltage of the first sensing node SN1 may shift to be adjacent to the second driving voltage ELVSS. That is, after the fifth readout period st5, the detection signal voltage VC has a level that is lower than the saturation voltage VS by the first detection signal voltage V1, and has a voltage level that is close to the second driving voltage ELVSS. Thereafter, even when the detection signal voltages V2, V3, and V4 received from the plurality of sensors FX2, FX3, and FX4 are accumulated, the voltage level of the accumulated detection signal VF may have a voltage level that is lower than the saturation voltage VS. That is, signal integration for improving accuracy and sensitivity may be easily obtained. Therefore, the electronic device DD (see FIG. 1) having improved detection reliability may be provided.

In addition, according to one or more embodiments of the present disclosure, the detection signal voltage VC may be accumulated by the accumulated detection signal voltage VF, thereby increasing an AC component. Accordingly, signals for sensing blood pressure may be easily obtained and noise components may be reduced or removed. Therefore, the electronic device DD (see FIG. 1) having improved detection reliability may be provided.

In addition, the first sampling signal SHS includes the fourth readout period st4 having a turn-off voltage. During the fourth readout period st4, the capacitor Cf may be reset according to the feedback reset signal IRST described above, and the voltage may be held in the second capacitor Csh2 according to the second sampling signal SHR.

To summarize, the first to fourth detection signal voltages V1, V2, V3, and V4 may be accumulated and held in the first capacitor Csh1. That is, the accumulated detection signal voltage VF from the first to fourth row sensors FX1, FX2, FX3, and FX4 may be held in the first capacitor Csh1 during the third readout period st3. Accordingly, the voltage in which the initial voltage VREF, the noise signal voltage, and the accumulated sense signal voltage VF are added may be held in the first capacitor Csh1.

The analog-to-digital converter 530 may convert the detection signal voltage VC into a data value by differentiating the voltage held in the second capacitor Csh2 and the voltage held in the first capacitor Csh1, and may provide the data value to the driving controller 100. The detection signals S_FS (see FIG. 3) may include the data value.

The first horizontal period HT1, which is the turn-on period of the switch SW, the first switch SW1, and the second switch SW2 of the readout circuit 500, and the second horizontal period HT2, which is the turn-on period of the output transistor ST3 of the sensor FX, sequentially work as shown in FIG. 9, the first horizontal period HT1 may be greater than the second horizontal period HT2.

In addition, the third readout period st3 in which the first sampling signal SHS has a turn-on voltage may be greater than the second horizontal period HT2. For example, the first to fourth row sensors FX1, FX2, FX3, and FX4 may respond to the first to fourth write scan signals SWS1, SWS2, SWS3, and SWS4, and thus may sequentially output the first to fourth readout signals FS1, FS2, FS3, and FS4 through the first readout line RL1. According to the second horizontal period HT2 (e.g., about 3.2 μs (microsecond)) of the write scan signal SWSj, the first to fourth readout signals FS1, FS2, FS3, and FS4 may be sequentially output to the readout circuit 500.

Meanwhile, the readout circuit 500 may output the detection signal voltage VC once during the first horizontal period HT1 (e.g., about 12.8 μs). For example, the detection signal voltage VC may be generated every first horizontal period HT1, which is the turn-on period of the switch SW, the first switch SW1, and the second switch SW2 of the readout circuit 500. That is, the readout circuit 500 may generate a detection signal data value according to the detection signal voltage VC every first horizontal period HT1, and may calculate pulse wave signals therefrom.

To summarize, the third readout period st3 in which the first sampling signal SHS has a turn-on voltage is greater than the first horizontal period HT1 of the write scan signal SWSj, and accordingly, a plurality of readout signals FSd from a plurality of sensors FX may be held in the first capacitor Csh1. Accordingly, the readout circuit 500 may receive the plurality of readout signals FSd, and may hold the accumulated detection signal voltage VF. Accordingly, the readout circuit 500 may output pulse wave signals according to the accumulated detection signal voltage VF, and may sense blood pressure based on the pulse wave signals.

Figure 10:
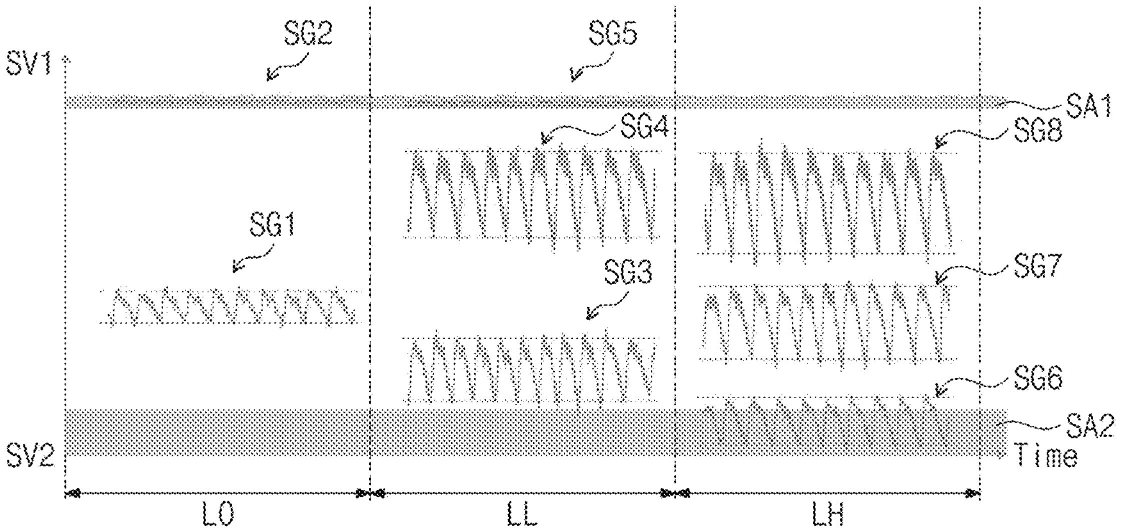
FIG. 10 is a graph showing detection signal voltage according to the luminance of a pixel located in a first region of FIG. 6.

FIG. 10 is a graph showing detection signal voltage according to the luminance of a pixel located in a first region of FIG. 6.

Referring to FIGS. 6, 7, 9, and 10, the x-axis of the graph may show time. The y-axis of the graph may show data values converted from the detection signal voltage VC. For example, the data value may be defined as a first data value SV1 to a second data value SV2. For example, the first data value SV1 may be about 0. The second data value SV2 may be about 65535.

A region close to the first data value SV1 may be defined as a first signal saturation region SA1. A region close to the second data value SV2 may be defined as a second signal saturation region SA2. When signals fall into the first signal saturation region SA1 or the second signal saturation region SA2, the signals may be saturated, and signal reliability may be reduced.

In the graph, first one or more embodiments LO, second one or more embodiments LL, and third one or more embodiments LH may be defined.

The first one or more embodiments LO may be defined by the first pixel APX1 located in the first region XA1 being turned off to emit no light, and the second pixel APX2 located in the second region AX2 being turned on to emit light. For example, the first one or more embodiments LO may describe a typical method of sensing blood pressure.

The second one or more embodiments LL and the third one or more embodiments LH may be defined as a period in which the first pixel APX1 located in the first region XA1 and the second pixel APX2 located in the second region XA2 are turned on to emit light. For example, the second one or more embodiments LL may be for comparison, and the third one or more embodiments LH may describe a method of sensing blood pressure.

In this case, the first pixel APX1 in the second one or more embodiments LL may have lower luminance than the first pixel APX1 in the third one or more embodiments LH. For example, the first pixel APX1 in the second one or more embodiments LL may emit light at a gray level of about 150, and the first pixel APX1 in the third one or more embodiments LH may emit light at a gray level of about 185 or about 200, but the present disclosure is not limited thereto.

The first to eighth signals SG1, SG2, SG3, SG4, SG5, SG6, SG7, and SG8 each indicate a pulse wave signal output from the readout circuit 500.

In the first one or more embodiments LO, the first signal SG1 and the second signal SG2 may be output.

The first signal SG1 may be the first readout signal FS1 detected by the first row sensor FX1. That is, the first signal SG1 may be a pulse wave signal in which the readout circuit 500 receives and outputs signals from one sensor. For example, a DC component of the first signal SG1 may have a data value of about 28906, and an AC component may have a data value having a width of about 157.

The second signal SG2 may be a signal in which the first readout signal FS1 detected by the first row sensor FX1 and the second readout signal FS2 detected by the second row sensor FX2 are accumulated. That is, the second signal SG2 may be a pulse wave signal in which the readout circuit 500 receives, integrates, and outputs signals from two sensors. For example, a DC component of the second signal SG2 may have a data value of 69, and an AC component may have a data value having a width of 17.

The second signal SG2 may correspond to the first signal saturation region SA1. That is, the second signal SG2 corresponds to the first signal saturation region SA1, and thus the width of the AC component may not be secured. Therefore, the second signal SG2 is not suitable as a signal for detecting a pulse wave signal, and thus a maximum signal that may be obtained in the first one or more embodiments LO may be the first signal SG1.

In the second one or more embodiments LL, the third signal SG3, the fourth signal SG4, and the fifth signal SG5 may be output.

The third signal SG3 may be a signal of the first readout signal FS1 detected by the first row sensor FX1. That is, the third signal SG3 may be a pulse wave signal in which the readout circuit 500 receives and outputs signals from one sensor. For example, a DC component of the third signal SG3 may have a data value of about 41033, and an AC component may have a data value having a width of about 232.

In the second one or more embodiments LL, the first sensor AFX1 may detect the first light of the first pixel APX1 and the second light of the second pixel APX2 to detect blood vessels for sensing blood pressure. Accordingly, the DC component of the signal that the readout circuit 500 outputs may increase. When comparing the first signal SG1 output from the first one or more embodiments LO and the third signal SG3 output from the second one or more embodiments LL, in the condition that signals are received from the same number of sensors, the DC component of the third signal SG3 may be greater than the DC component of the first signal SG1. For example, the DC component of the third signal SG3 may be increased by about 42.0% compared to the DC component of the first signal SG1.

The fourth signal SG4 may be a signal in which the first readout signal FS1 detected by the first row sensor FX1 and the second readout signal FS2 detected by the second row sensor FX2 are accumulated. That is, the fourth signal SG4 may be a pulse wave signal in which the readout circuit 500 receives, integrates, and outputs signals from two sensors. For example, a DC component of the fourth signal SG4 may have a data value of about 19212, and an AC component may have a data value having a width of about 392.

The fifth signal SG5 may be a signal in which the first readout signal FS1 detected by the first row sensor FX1, the second readout signal FS2 detected by the second row sensor FX2, and the third readout signal FS3 detected by the third row sensor FX3 are accumulated. That is, the fifth signal SG5 may be a pulse wave signal in which the readout circuit 500 receives, integrates, and outputs signals from three sensors. For example, a DC component of the fifth signal SG5 may have a data value of about 311, and an AC component may have a data value having a width of about 18.

The fifth signal SG5 may correspond to the first signal saturation region SA1. That is, the fifth signal SG5 corresponds to the first signal saturation region SA1, and thus the width of the AC component may not be secured. Therefore, the fifth signal SG5 is not suitable as a signal for detecting a pulse wave signal, and thus a maximum signal that may be obtained in the second one or more embodiments LL may be the fourth signal SG4.

In the third one or more embodiments LL, the sixth signal SG6, the seventh signal SG7, and the eighth signal SG8 may be output.

The sixth signal SG6 may be a signal of the first readout signal FS1 detected by the first row sensor FX1. That is, the sixth signal SG6 may be a pulse wave signal in which the readout circuit 500 receives and outputs signals from one sensor. For example, a DC component of the sixth signal SG6 may have a data value of about 46150, and an AC component may have a data value having a width of about 196. The sixth signal SG6 may correspond to the second signal saturation region SA2. Therefore, the sixth signal SG6 may not be suitable as a signal for detecting a pulse wave signal.

The seventh signal SG7 may be a signal in which the first readout signal FS1 detected by the first row sensor FX1 and the second readout signal FS2 detected by the second row sensor FX2 are accumulated. That is, the seventh signal SG7 may be a pulse wave signal in which the readout circuit 500 receives, integrates, and outputs signals from two sensors. For example, a DC component of the seventh signal SG7 may have a data value of about 29767, and an AC component may have a data value having a width of about 364.

According to one or more embodiments of the present disclosure, in the third one or more embodiments LH, the first sensor AFX1 may detect the first light of the first pixel APX1 and the second light of the second pixel APX2 to detect blood vessels for sensing blood pressure. Accordingly, the DC component of the signal that the readout circuit 500 outputs may increase. When comparing the fourth signal SG4 output from the second one or more embodiments LL and the seventh signal SG7 output from the third one or more embodiments LL, in the condition that signals are received from the same number of sensors, the DC component of the seventh signal SG7 may be greater than the DC component of the fourth signal SG4. For example, the DC component of the seventh signal SG7 may be increased by about 54.9% compared to the DC component of the fourth signal SG4.

In addition, according to one or more embodiments of the present disclosure, the third one or more embodiments LH has an increased DC component compared to the first one or more embodiments LO, making signal integration easier. When comparing the first signal SG1 and the seventh signal SG7, which have DC components with similar data values, the AC component of the seventh signal SG7 may be greater than the AC component of the first signal SG1. For example, the AC component of the seventh signal SG7 may be increased by about 131.8% compared to the AC component of the first signal SG1.

The eighth signal SG8 may be a signal in which the first readout signal FS1 detected by the first row sensor FX1, the second readout signal FS2 detected by the second row sensor FX2, and the third readout signal FS3 detected by the third row sensor FX3 are accumulated. That is, the eighth signal SG8 may be a pulse wave signal in which the readout circuit 500 receives and outputs signals from three sensors.

For example, a DC component of the eighth signal SG8 may have a data value of about 19506, and an AC component may have a data value having a width of about 493.

According to one or more embodiments of the present disclosure, the third one or more embodiments LH has an increased DC component compared to the second one or more embodiments LL, making signal integration easier. When comparing the fourth signal SG4 and the eighth signal SG8, which have DC components with similar data values, the AC component of the eighth signal SG8 may be greater than the AC component of the fourth signal SG4. For example, the AC component of the eighth signal SG8 may be increased by about 25.8% compared to the AC component of the fourth signal SG4.

The eighth signal SG8 may not correspond to the first signal saturation region SA1. Accordingly, the eighth signal SG8 may be suitable as a signal for detecting a pulse wave signal, and thus a maximum signal that may be obtained in the third one or more embodiments LH may be the eighth signal SG8.

When comparing the first signal SG1, the fourth signal SG4, and the eighth signal SG8, which are the maximum signals obtainable in the embodiments LO, LL, and LH, the eighth signal SG8 may have a large AC component. With the larger AC component, the pulse wave signal may be more easily detected. That is, in the third one or more embodiments LH, the pulse wave signal may be detected most easily.

FIGS. 11A, 11B, 11C, and 11D are plan views enlarging a region corresponding to region AA of FIG. 3 according to one or more embodiments of the present disclosure. In the description of FIGS. 11A, 11B, 11C, and 11D, the same reference numerals are given for the components described through FIG. 6, and descriptions thereof are not provided.

Figure 11A:
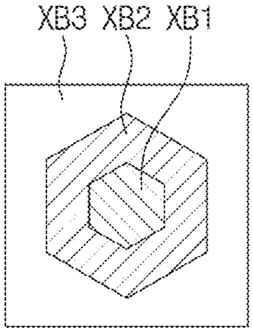
FIGS. 11A, 11B, 11C, and 11D are plan views enlarging a region corresponding to region AA of FIG. 3 according to one or more embodiments of the present disclosure.

Referring to FIG. 11A, the display region DA (see FIG. 3) may include a first region XB1, a second region XB2, and a third region XB3.

The first region XB1 may have a polygonal shape. The first region XB1 may have a hexagonal shape. The second region XB2 may correspond to the shape of the first region XB1, and may have a shape that surrounds the first region XB1. The third region XB3 may surround the first region XB1 and the second region XB2.

Figure 11B:
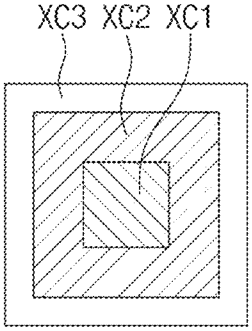

Referring to FIG. 11B, the display region DA (see FIG. 3) may include a first region XC1, a second region XC2, and a third region XC3.

The first region XC1 may have a polygonal shape. The first region XC1 may have a rectangular shape. The second region XC2 may correspond to the shape of the first region XC1, and may have a shape that surrounds the first region XC1. The third region XC3 may surround the first region XC1 and the second region XC2.

Figure 11C:
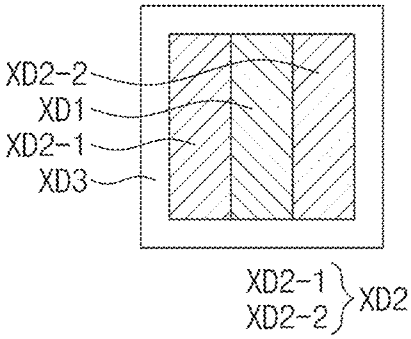

Referring to FIG. 11C, the display region DA (see FIG. 3) may include a first region XD1, a second region XD2, and a third region XD3.

The second region XD2 may include a (2-1)-th region XD2-1 and a (2-2)-th region XD2-2. The (2-1)-th region XD2-1 may be spaced apart from the (2-2)-th region XD2-2. The first region XD1 may be located between the (2-1)-th region XD2-1 and the (2-2)-th region XD2-2. The third region XD3 may surround the first region XD1 and the second region XD2.

Figure 11D:
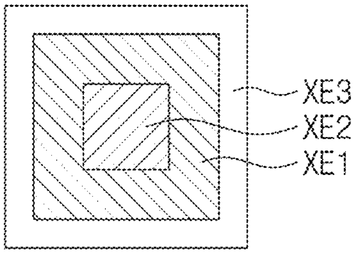

Referring to FIG. 11D, the display region DA (see FIG. 3) may include a first region XE1, a second region XE2, and a third region XE3.

The second region XE2 may have a polygonal shape. The second region XE2 may have a rectangular shape. The first region XE1 may correspond to the shape of the second region XE2, and may have a shape that surrounds the second region XE2. The third region XE3 may surround the first region XE1 and the second region XE2.

Referring to FIGS. 11A, 11B, 11C, and 11D, according to the shape of the first regions XB1, XC1, XD1, and XE1, the shapes of the second regions XB2, XC2, and XE2, the (2-1)-th region XD2-1, and the (2-2)-th region XD2-2 may be adjusted.

According to one or more embodiments of the present disclosure, the shape of each of the first regions XA1, XB1, XC1, XD1, and XE1 in which the turned-on first sensor AFX1 (see FIG. 6) is located may be provided in various shapes. Depending on the shape, the extent of integration of light received by the first sensor AFX1 (see FIG. 6) may be improved. Therefore, the electronic device DD (see FIG. 1) having improved detection reliability may be provided.

FIGS. 12A, 12B, 12C, 12D, and 12E are plan views enlarging a region corresponding to region AA of FIG. 3 according to one or more embodiments of the present disclosure. In the description of FIGS. 12A, 12B, 12C, 12D, and 12E, the same reference numerals are given for the components described through FIG. 6, and FIGS. 11A, 11B, 11C, and 11D, and descriptions thereof may be omitted or briefly described.

Figure 12A:
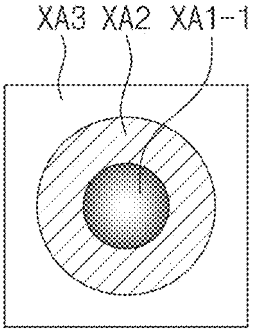
FIGS. 12A, 12B, 12C, 12D, and 12E are plan views enlarging a region corresponding to region AA of FIG. 3 according to one or more embodiments of the present disclosure.

Referring to FIGS. 6 and 12A, the display region DA (see FIG. 3) may include a (1-1)-th region XA1-1, a second region XA2, and a third region XA3.

A plurality of first pixels APX1 may be located in the (1-1)-th region XA1-1. The first pixel APX1 located at the center of the (1-1)-th region XA1-1 may have the highest luminance. As the first pixel APX1 is located farther away from the center of the (1-1)-th region XA1-1, the luminance of the first pixel APX1 may gradually decrease.

Figure 12B:
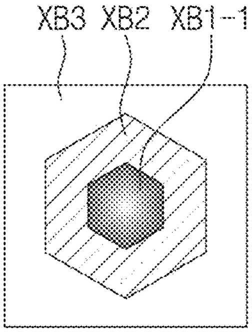

Referring to FIGS. 6 and 12B, the display region DA (see FIG. 3) may include a (1-1)-th region XB1-1, a second region XB2, and a third region XB3.

A plurality of first pixels APX1 may be located in the (1-1)-th region XB1-1. The luminance of the first pixel APX1 located at the center of the (1-1)-th region XB1-1 may be the highest among the luminances of the first pixel APX1 located in the (1-1)-th region XB1-1. As the first pixel APX1 is located farther away from the center of the (1-1)-th region XB1-1, the luminance of the first pixel APX1 may gradually decrease.

Figure 12C:
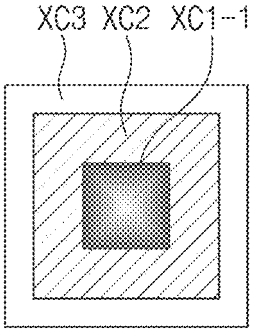

Referring to FIGS. 6 and 12C, the display region DA (see FIG. 3) may include a (1-1)-th region XC1-1, a second region XC2, and a third region XC3.

A plurality of first pixels APX1 may be located in the (1-1)-th region XC1-1. The luminance of the first pixel APX1 located at the center of the (1-1)-th region XC1-1 may be the highest among the luminances of the first pixel APX1 located in the (1-1)-th region XC1-1. As the first pixel APX1 is located farther away from the center of the (1-1)-th region XC1-1, the luminance of the first pixel APX1 may gradually decrease.

Figure 12D:
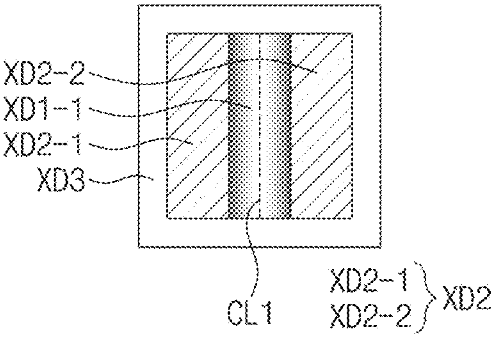

Referring to FIGS. 6 and 12D, the display region DA (see FIG. 3) may include a (1-1)-th region XD1-1, a second region XD2, and a third region XD3. The second region XD2 may include a (2-1)-th region XD2-1 and a (2-2)-th region XD2-2.

A plurality of first pixels APX1 may be located in the (1-1)-th region XD1-1. The luminance of the first pixel APX1 located at a first center line CL1 of the (1-1)-th region XD1-1 may be the highest among the luminances of the first pixel APX1 located in the (1-1)-th region XD1-1. As the first pixel APX1 is located farther away from the first center line CL1, the luminance of the first pixel APX1 may gradually decrease.

Figure 12E:
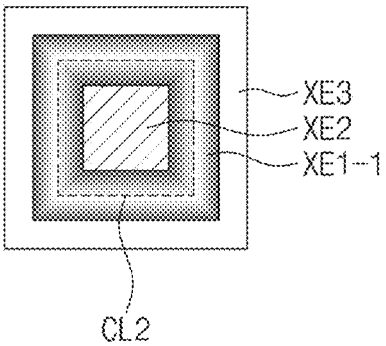

Referring to FIGS. 6 and 12E, the display region DA (see FIG. 3) may include a (1-1)-th region XE1-1, a second region XE2, and a third region XE3.

The luminance of the first pixel APX1 located at a second center line CL2 of the (1-1)-th region XE1-1 may be the highest among the luminances of the first pixel APX1 located in the (1-1)-th region XE1-1 (e.g., the second center line CL2 may be a closed loop shape). As the first pixel APX1 is located farther away from the second center line CL2, the luminance of the first pixel APX1 may gradually decrease.

According to one or more embodiments of the present disclosure, the shape of each of the first regions XA1-1, XB1-1, XC1-1, XD1-1, and XE1-1 in which the first sensor AFX1 which is turned on is located may be provided in various shapes. Depending on the shape, the extent of integration of light received by the first sensor AFX1 may be improved. Accordingly, the DC component of signals received by the first sensor AFX1 may increase. In addition, light emitted from each of the first regions XA1-1, XB1-1, XC1-1, XD1-1, and XE1-1 in which the turned-on first pixel APX1 is located may have radial gradation. Accordingly, the AC component of signals received by the first sensor AFX1 may increase. Therefore, the electronic device DD (see FIG. 1) having improved detection reliability may be provided.

Figure 13:
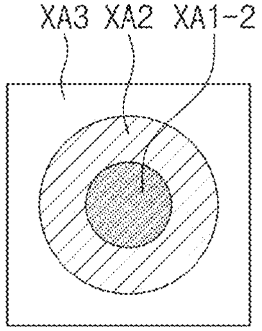
FIG. 13 is a plan view enlarging a region corresponding to region AA of FIG. 3 according to one or more embodiments of the present disclosure.

FIG. 13 is a plan view enlarging a region corresponding to region AA of FIG. 3 according to one or more embodiments of the present disclosure. In the description of FIG. 13, the same reference numerals are given for the components described through FIG. 6, and descriptions thereof are not provided.

Referring to FIGS. 2, 3, 6, and 13, the display region DA may include a (1-2)-th region XA1-2, a second region XA2, and a third region XA3.

The first pixel APX1 and the first sensor AFX1 may be located in the (1-2)-th region XA1-2. The light-emitting element ED (see FIG. 4A) of the first pixel APX1 may emit first light with a first luminance. In this case, the first light may have a first wavelength.

The second pixel APX2 may be located in the second region XA2. The light-emitting element ED of the second pixel APX2 may emit second light with a second luminance. The first sensor AFX1 may receive first light and second light.

The second light may have a second wavelength that is different from the first wavelength. The first wavelength may be shorter than the second wavelength. For example, the first wavelength may be about 545 nm (nanometer) to about 600 nm, and the second wavelength may be about 600 nm to about 650 nm. For example, the first wavelength may be viewed as blue light or green light, and the second wavelength may be viewed as red light, but the present disclosure is not limited thereto.

The first wavelength may have a smaller penetration depth of light into the skin than the second wavelength. The larger the wavelength, the greater the penetration depth of light into the skin. For example, the penetration depth of light of the first wavelength into the skin may be about 0.5 mm to about 1.0 mm, and the penetration depth of light of the second wavelength into the skin may be about 1.0 mm to about 2.0 mm. In the sensing mode, when the user's hand US_F (see FIG. 1) contacts the window WM, the second light has a second wavelength, and thus the second light may be reflected, and may return to the arteries among blood vessels in the user's hand US_F. The first light has the first wavelength, and thus the first light may be reflected and may return to the arterioles among blood vessels in the user's hand US_F. The first sensor AFX1 may detect the reflected first and second light to sense blood vessels. The first sensor AFX1 may transmit the readout signal FSd (see FIG. 4A) containing information obtained by sensing blood pressure to the readout circuit 500.

In one or more embodiments, light emitted from the (1-2)-th region XA1-2 in which the turned-on first pixel APX1 is located may have radial gradation. according to one or more embodiments of the present disclosure, the wavelength of light emitted from the (1-2)-th region XA1-2 and the second region XA2 may be set to be different. When the light emitted from the (1-2)-th region XA1-2 and the second region XA2 senses the user's hand US_F, the penetration depth of the light may vary. Accordingly, the light emitted from the (1-2)-th region XA1-2 may obtain an arteriole signal, and the light emitted from the second region XA2 may obtain an artery signal. The readout circuit 500 may amplify only the artery signal to improve or maximize pulse wave signals. Therefore, the electronic device DD (see FIG. 1) having improved detection reliability may be provided.

Figure 14:
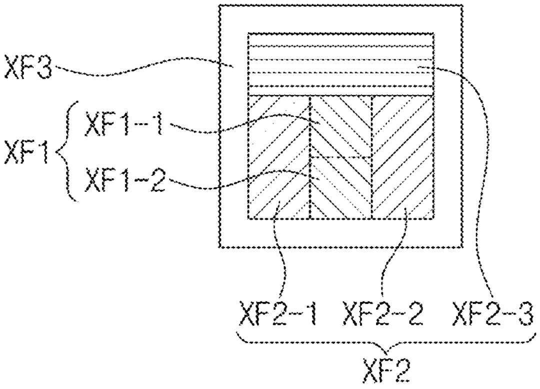
FIG. 14 is a plan view enlarging a region corresponding to region AA of FIG. 3 according to one or more embodiments of the present disclosure.

FIG. 14 is a plan view enlarging a region corresponding to region AA of FIG. 3 according to one or more embodiments of the present disclosure. In the description of FIG. 14, the same reference numerals are given for the components described through FIG. 6, and descriptions thereof are not provided.

Referring to FIGS. 6 and 14, the display region DA (see FIG. 3) may include a first region XF1, a second region XF2, and a third region XF3.

The first region XF1 may include a (1-1)-th region XF1-1, and a (1-2)-th region XF1-2 adjacent to the (1-1)-th region XF1-1. The second region XF2 may include a (2-1)-th region XF2-1, a (2-2)-th region XF2-2 spaced apart from and the (2-1)-th region XF2-1, and a (2-3)-th region XF2-3. The first region XF1 may be located between the (2-1)-th region XF2-1, the (2-2)-th region XF2-2, and the (2-3)-th region XF2-3. The third region XF3 may surround the first region XF1 and the second region XF2.

The second light may have a first wavelength and a second wavelength. The second light may include (2-1)-th light having a second wavelength, and (2-2)-th light having a first wavelength that is different from the second wavelength. The second pixels APX2 located in the (2-1)-th region XF2-1 and the (2-2)-th region XF2-2 may emit the (2-1)-th light, and the second pixels APX2 located in the (2-3)-th region XF2-3 may emit the (2-2)-th light. The first wavelength may be shorter than the second wavelength. The first wavelength may have less penetration depth than the second wavelength. For example, the first wavelength may be green light and the second wavelength may be red light, but the present disclosure is not limited thereto.

The first sensor AFX1 located in the (1-1)-th region XF1-1 may receive the (2-1)-th light and the (2-2)-th light. The first sensor AFX1 located in the (1-2)-th region XF1-2 may receive the (2-1)-th light.

In the sensing mode, when the user's hand US_F contacts the window WM, the (2-1)-th light has a second wavelength, and thus the (2-1)-th light may be reflected and may return to the arteries among blood vessels in the user's hand US_F. The (2-2)-th light has the first wavelength, and thus the (2-2)-th light may be reflected and may return to the arterioles among blood vessels in the user's hand US_F. The first sensor AFX1 may detect the reflected (2-1)-th and (2-2)-th light to sense blood vessels. The first sensor AFX1 may transmit the readout signal FSd containing information obtained by sensing blood vessels to the readout circuit 500.

According to one or more embodiments of the present disclosure, the pixels located in the (2-1)-th region XF2-1 and the (2-2)-th region XF2-2 may have a second wavelength, and the second pixel APX2 located in the (2-3)-th region XF2-3 may have a first wavelength. The first wavelength may be shorter than the second wavelength, and thus the penetration depth of light may vary when sensing the user's hand US_F (see FIG. 1). Therefore, the light emitted from the (2-1)-th region XF2-1 and the (2-2)-th region XF2-2 may obtain artery signals, and the light emitted from the (2-3)-th region XF2-3 may obtain arteriole signals. The readout circuit 500 (see FIG. 3) may amplify only the artery signals to improve or maximize pulse wave signals. The electronic device DD (see FIG. 1) having improved detection reliability may be provided.

As described above, an electronic device may readily sense blood pressure by causing a light-emitting region and a light-receiving region to emit light for sensing. Accordingly, an electronic device having improved reliability may be provided.

Although the present disclosure has been described with reference to a embodiments of the present disclosure, it will be understood that the present disclosure should not be limited to these preferred embodiments but various changes and modifications may be made by those skilled in the art without departing from the spirit and scope of the present disclosure. Hence, the technical scope of the present disclosure is not limited to the detailed descriptions in the specification but should be determined only with reference to the claims, with functional equivalents thereof to be included therein.

What is claimed is:

1. An electronic device comprising:

a display panel having defined therein a display region comprising a first region, a second region adjacent to the first region, and a third region surrounding the first region and the second region, the display panel being configured to operate in a sensing mode, and comprising a first pixel in the first region, a second pixel in the second region, and a third pixel in the third region that comprise a pixel-driving circuit and a light-emitting element, and a first sensor in the first region, a second sensor, and a third sensor that comprise a sensor-driving circuit and a detection element, and a readout circuit electrically connected to the first sensor, the second sensor, or the third sensor, wherein, in the sensing mode, the first pixel is configured to emit first light with a first luminance, the second pixel is configured to emit second light with a second luminance that is different from the first luminance, the third pixel is configured to emit no light, and the readout circuit is configured to receive a readout signal from the first sensor.

2. The electronic device of claim 1, wherein the first sensor, the second sensor, or the third sensor in the display region is configured to sense blood pressure in the sensing mode.

3. The electronic device of claim 1, wherein the third sensor is in the third region.

4. The electronic device of claim 1, wherein, in the sensing mode, the first pixel, the first sensor, and the second pixel are configured to be turned on, and the second sensor, the third pixel, and the third sensor are configured to be turned off.

5. The electronic device of claim 1, wherein the first luminance is lower than the second luminance.

6. The electronic device of claim 1, wherein the sensor-driving circuit comprises:

a reset transistor comprising a gate electrode electrically connected to the detection element for receiving a reset control signal, a first electrode for receiving a reset voltage, and a second electrode connected to a first sensing node;

an amplifying transistor comprising a first electrode for receiving a sensor driving voltage, a second electrode connected to a second sensing node, and the gate electrode connected to the first sensing node; and an output transistor comprising a first electrode connected to the second sensing node, a second electrode connected to a readout line, and a gate electrode for receiving an output control signal.

7. The electronic device of claim 6, wherein the readout circuit further comprises:

an amplifier circuit for receiving the readout signal from the sensor-driving circuit through the readout line, and for amplifying the readout signal;

a sample-and-hold portion for sampling a signal provided from the amplifier circuit, for holding the signal, and comprising a reset portion that comprises a first switch and a first capacitor, and a hold portion that comprises a second switch and a second capacitor; and an analog-to-digital converter for digitizing an analog signal provided from the sample-and-hold portion.

8. The electronic device of claim 1, wherein the first region has a circular shape, and wherein the second region has a donut shape surrounding the first region.

9. The electronic device of claim 1, wherein the first region has a polygonal shape, and wherein the second region surrounds the first region.

10. The electronic device of claim 1, wherein the second region comprises a (2-1)-th region, and a (2-2)-th region spaced apart from the (2-1)-th region, and wherein the first region is between the (2-1)-th region and the (2-2)-th region.

11. The electronic device of claim 10, wherein the second light comprises (2-1)-th light having a first wavelength, and (2-2)-th light having a second wavelength that is different from the first wavelength, wherein the second region further comprises a (2-3)-th region adjacent the first region, wherein the (2-1)-th light is configured to be emitted to the (2-1)-th region and to the (2-2)-th region, wherein the (2-2)-th light is configured to be emitted to the (2-3)-th region, wherein the first region comprises a (1-1)-th region configured to receive light from the (2-1)-th to (2-3)-th regions, and a (1-2)-th region configured to receive light from the (2-1)-th region and the (2-2)-th region.

12. The electronic device of claim 1, wherein the first luminance gradually decreases away from a center of the first region.

13. The electronic device of claim 1, wherein the first light has a first wavelength, and wherein the second light has a second wavelength that is different from the first wavelength.

14. The electronic device of claim 13, wherein the first wavelength is shorter than the second wavelength.

15. An electronic device comprising a display panel having a display region comprising a first region, a second region adjacent to the first region, and a third region surrounding the first region and the second region, and comprising:

pixels comprising a pixel-driving circuit, a light-emitting element, first pixels in the first region, second pixel in the second region, third pixels in the third region;

readout lines; and sensors comprising a sensor-driving circuit and a detection element, and electrically connected to a readout circuit through one of the readout lines, wherein, in a sensing mode, the first pixels are configured to emit light with a first luminance, the second pixels are configured to emit second light with a second luminance that is different from the first luminance, the third pixels are configured to emit no light, and the readout circuit is configured to receive a readout signal from ones of the sensors in the second region.

16. The electronic device of claim 15, wherein the sensors in the display region are configured to sense blood pressure.

17. The electronic device of claim 15, wherein the first luminance is lower than the second luminance.

18. The electronic device of claim 15, wherein the first region has a circular shape, and wherein the second region has a donut shape surrounding the first region.

19. The electronic device of claim 15, wherein the first region has a polygonal shape, and wherein the second region surrounds the first region.

20. The electronic device of claim 15, wherein the second region comprises a (2-1)-th region, and a (2-2)-th region spaced apart from the (2-1)-th region, and wherein the first region is between the (2-1)-th region and the (2-2)-th region.

* * * * *